(12) United States Patent
Cheng et al.

(10) Patent No.: US 10,728,823 B2
(45) Date of Patent: Jul. 28, 2020

(54) METHODS, DEVICES, AND SYSTEMS FOR BEAM REFINEMENT DURING HANDOVER

(71) Applicant: FG Innovation Company Limited, Tuen Mun (HK)

(72) Inventors: Yu-Hsin Cheng, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/978,547

(22) Filed: May 14, 2018

(65) Prior Publication Data
US 2018/0332520 A1    Nov. 15, 2018

Related U.S. Application Data

(60) Provisional application No. 62/505,945, filed on May 14, 2017.

(51) Int. Cl.
*H04W 36/30* (2009.01)
*H04W 36/00* (2009.01)
(Continued)

(52) U.S. Cl.
CPC ......... *H04W 36/30* (2013.01); *H04B 7/0617* (2013.01); *H04W 36/0016* (2013.01);
(Continued)

(58) Field of Classification Search
None
See application file for complete search history.

(56) References Cited

U.S. PATENT DOCUMENTS

| 2013/0079018 A1* | 3/2013 | Teyeb .................. H04W 36/32 455/441 |
| 2014/0073329 A1 | 3/2014 | Kang et al. |

(Continued)

FOREIGN PATENT DOCUMENTS

CN        106165486 A      11/2016
WO    WO2018210202 A1 *   5/2018

OTHER PUBLICATIONS

3rd Generation Partnership Project 3GPP TR 38.804 v1.0.0 Study on New Radio Access Technology; Radio Interface Protocol Aspects (Release 14) Mar. 31, 2017(Mar. 31, 2017), the whole document.
(Continued)

*Primary Examiner* — Jeffrey M Rutkowski
*Assistant Examiner* — Andre Tacdiran
(74) *Attorney, Agent, or Firm* — ScienBiziP, P.C.

(57) ABSTRACT

A method for performing handover of a user equipment (UE) from a source base to a target base station is disclosed. The method includes providing, by the UE, a measurement report to the source base station, the measurement report including beam-related measurements of the target base station, providing, by the source base station, a Handover Request message to the target base station, the Handover Request message including the measurement report from the UE, providing, by the target base station, a Handover Request Acknowledgement message to the source base station, the Handover Request Acknowledgement message having a Handover Command, and providing, by the source base station, mobility control information to the UE based on the Handover Command from the target base station.

15 Claims, 15 Drawing Sheets

(51) Int. Cl.
  *H04W 74/00* (2009.01)
  *H04W 74/08* (2009.01)
  *H04B 7/06* (2006.01)
  *H04W 36/32* (2009.01)
  *H04B 7/08* (2006.01)

(52) U.S. Cl.
  CPC ... *H04W 36/0058* (2018.08); *H04W 36/0088* (2013.01); *H04W 36/32* (2013.01); *H04W 74/008* (2013.01); *H04W 74/0891* (2013.01); *H04B 7/0626* (2013.01); *H04B 7/0695* (2013.01); *H04B 7/088* (2013.01); *H04W 74/0833* (2013.01)

(56) References Cited

U.S. PATENT DOCUMENTS

| | | | |
|---|---|---|---|
| 2015/0181485 A1 | 6/2015 | Son et al. | |
| 2015/0350969 A1* | 12/2015 | Dudda | H04W 36/0005 370/331 |
| 2016/0183234 A1* | 6/2016 | Sung | H04W 72/046 370/329 |
| 2017/0033854 A1 | 2/2017 | Yoo | |
| 2017/0054479 A1 | 2/2017 | Sang et al. | |
| 2017/0195935 A1* | 7/2017 | Xu | H04W 36/08 |
| 2018/0020472 A1* | 1/2018 | Lin | H04W 72/14 |
| 2018/0084473 A1* | 3/2018 | Nagaraja | H04W 24/04 |
| 2018/0098234 A1* | 4/2018 | Kim | H04L 5/0053 |
| 2018/0124647 A1* | 5/2018 | Dai | H04W 72/08 |
| 2018/0132158 A1* | 5/2018 | Tseng | H04W 76/27 |
| 2018/0227812 A1* | 8/2018 | Nagasaka | H04W 24/10 |
| 2018/0242210 A1* | 8/2018 | Reial | H04W 36/0088 |
| 2018/0242327 A1* | 8/2018 | Frenne | H04L 25/0224 |
| 2018/0279181 A1* | 9/2018 | Hampel | H04W 36/0033 |
| 2018/0323850 A1* | 11/2018 | Baligh | H04W 56/003 |
| 2018/0324864 A1* | 11/2018 | Jung | H04W 24/10 |
| 2018/0324865 A1* | 11/2018 | Hui | H04B 7/088 |
| 2019/0141584 A1* | 5/2019 | Ben Henda | H04W 12/04 |
| 2019/0174434 A1* | 6/2019 | Koskinen | H04W 74/0833 |

OTHER PUBLICATIONS

NTT Docomo Inc.: "Study on New Radio Access Technology; Radio Access Architecture and Interfaces"; 3GPP Draft RP-170490, TR 38.801 v2.0.0, Rel-14; Document for Approval; 3GPP TSG-RAN Meeting #75, Mar. 6-9, 2017; 650 Route des Lucioles—Sophia Antipolis, Valbonne, France; TSG-RAN WG3; Dubrovnik, Croatia; V2.0.0, Mar. 6, 2017; Retrieved from Internet: http://www.3gpp.org/ftp/TSG_RAN/TSG_RAN/TSGR_75/Docs/RP-170490.zip [Retrieved on Apr. 3, 2019].

* cited by examiner

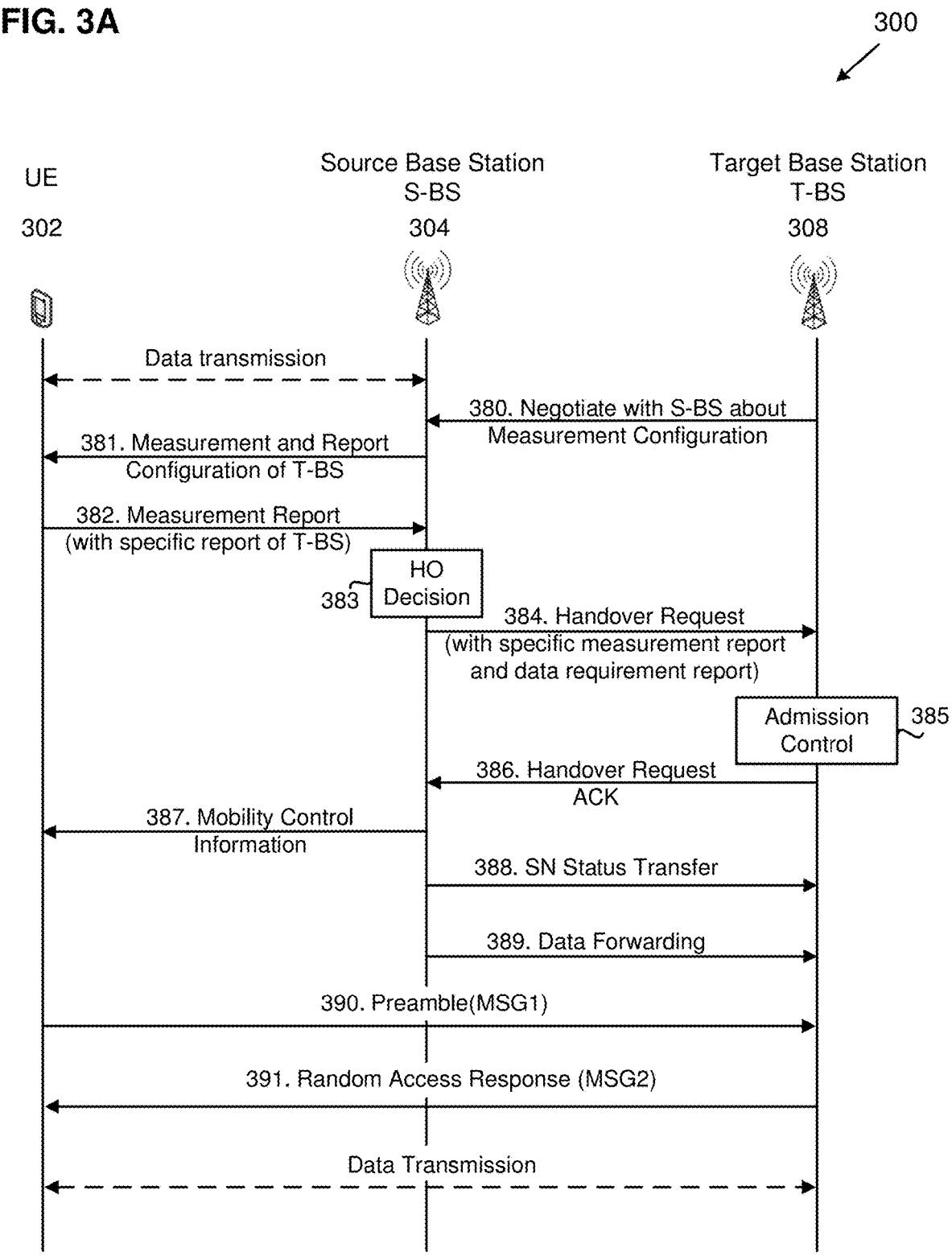

METHODS, DEVICES, AND SYSTEMS FOR BEAM REFINEMENT DURING HANDOVER

CROSS-REFERENCE TO RELATED APPLICATION(S)

The present application claims the benefit of and priority to a provisional U.S. Patent Application Ser. No. 62/505,945 filed May 14, 2017, entitled "SYSTEMS AND METHODS FOR BEAM REFINEMENT DURING HANDOVER," (hereinafter referred to as "US62238 application"). The disclosure of the US62238 application is hereby incorporated fully by reference into the present application.

TECHNICAL FIELD

The present disclosure generally relates to wireless communication, and more particularly, to systems and methods in which a user equipment (UE) performs a handover procedure, from a source cell under the control of a source radio base station to a target cell under the control of a target radio base station, while performing beam refinement.

BACKGROUND

Wireless communication networks have looked to high gain antennas, such as phase array antennas, to realize large gains and scan angles in order to compensate adverse channel conditions and high pathloss during high frequency band transmissions. Directional beamforming can be used to boost signal power for both transmission (TX) and reception (RX) ends of a wireless communication system. As the gain of an antenna (or antenna array) is inversely proportional to the beamwidth of the beam pattern formed by the antenna, the antenna needs to reduce the beamwidth to achieve high beamforming gain to alleviate performance degradations caused by, for example, pathloss. As a result, the network and/or user equipment need to perform beam alignment, which requires extra steps to align the direction of the beam(s) toward the target for transmission and/or reception. To achieve higher beamforming gains, the network needs to spend more resources on beam alignment as the beamwidth gets increasingly narrower.

A network and a UE may apply different kinds of beams based on different performance requirements and their respective measurements. Also, reference signaling may be applied for radio resource management (RRM) purposes. A coarse beam has a wider beamwidth but less beamforming gain, as compared to a fine beam that has a much narrower beamwidth but more beamforming gain. For example, a coarse beam with a wide beamwidth is more useful for carrying control information when a UE attempts to access a cell. Thus, coarse beams are more suitable during an initial access phase, as wide beamwidths have better chances to establish a connection with a cell (e.g., due to large coverage and simple synchronization). On the other hand, fine beams are more suitable for high speed data transmissions at high frequencies and with high gains.

Although a coarse beam with a wide beamwidth may be beneficial during the initial access phase, factors such as low beamforming gain of the coarse beam may impact the performance. For example, a wide beamwidth may cause excessive interference during a random access channel (RACH) procedure. Lower beamforming gain also means that it is hard for UEs at the cell boundary or moving across the boundary of a source cell and a target cell to establish a connection with the target cell's base station. In addition, applying coarse beamforming may only allow low modulation and coding scheme (MCS) for transmission. As such, after establishing an initial connection, the network has to spend additional resources on performing beam refinement to find one or more suitable fine beams for data transmission and reception.

As the $3^{rd}$ Generation Partnership Project (3GPP) is RAN2 Working Group has made an agreement to support RACH procedure during handover, which is an event in which a network transfers an ongoing data session from a source base station to a target base station, there is a need in the art for beam refinement during the handover as a UE moves across the boundary of a source cell and a target cell, such that the quality-of-service (e.g., a high speed and/or high volume data communication from and/or to the UE) can be maintained during and immediately after the handover.

SUMMARY

The present disclosure is directed to methods, devices and systems for beam refinement during handover.

In a first aspect, a method for performing handover of a user equipment (UE) from a source base to a target base station is provided, the method comprising: providing, by the UE, a measurement report to the source base station, the measurement report including beam-related measurements of the target base station; providing, by the source base station, a Handover Request message to the target base station, the Handover Request message including the measurement report from the UE; providing, by the target base station, a Handover Request Acknowledgement message to the source base station, the Handover Request Acknowledgement message having a Handover Command; and providing, by the source base station, mobility control information to the UE based on the Handover Command from the target base station.

In an example of the first aspect, the measurement report is contained in an information element of the Handover Request message.

In another example of the first aspect, the measurement report includes at least one of a synchronization signal (SS) block index or a channel state information-reference signal (CSI-RS) resource index (CRI).

In another example of the first aspect, the mobility control information includes at least one of a dedicated physical random access channel (PRACH) resource configuration and a dedicated random access channel (RACH) resource for the UE to communicate with the target base station.

In another example of the first aspect, the Handover Request message further includes a data requirement report of the UE.

In another example of the first aspect, the method further includes determining, by the target base station, whether to perform beam refinement during the handover based on the data requirement report.

In another example of the first aspect, when the target base station determines to perform beam refinement, the target base station configures a preamble index and a PRACH resource corresponding to at least one fine beam for the UE, and sends resource allocation information of the preamble index and the PRACH resource to the source base station through the Handover Request Acknowledgement message.

In another example of the first aspect, when the target base station determines not to perform beam refinement, the target base station configures a preamble index and a PRACH resource corresponding to at least one coarse beam for the UE, and sends resource allocation information of the preamble index and the PRACH resource to the source base station through the Handover Request Acknowledgement message.

In another example of the first aspect, the Handover Request message is provided by the source base station to the target base station through an access and mobility management function (AMF).

In another example of the first aspect, the method further includes selecting, by the UE, the preamble index and the PRACH resource; transmitting, by the UE, a random access preamble to the target base station in the selected PRACH resource.

In another example of the first aspect, the target base detects the random access preamble from the UE in the selected PRACH resource.

In another example of the first aspect, wherein at least one of the PRACH resource or the preamble index is selected by the UE based on measurements of at least one of CSI-RS reference signal received power (CSI-RS-RSRP) or SS block reference signal received power (SSB-RSRP).

In another example of the first aspect, the target base station monitors the PRACH resource using a spatial domain filter that is used for transmitting at least one of an SS block index or a CRI indicated to the UE in the Handover Command.

In another example of the first aspect, the target base station transmits a Physical Downlink Shared Channel (PDSCH) for a random access response to the UE based on the spatial domain filter or quasi co-location (QCL) information.

In another example of the first aspect, the spatial domain filer or the QCL information is based on the preamble index and the PRACH resource.

In another example of the first aspect, the spatial domain filer is determined based on the random access preamble received in the PRACH resource.

In another example of the first aspect, wherein when receiving the PDSCH for the random access response, the UE assumes that the demodulation reference signal (DM-RS) of the PDSCH is quasi co-located with the SS block or the CSI-RS resource.

In a second aspect, a user equipment (UE) is provided, the UE comprising one or more non-transitory computer-readable media having computer-executable instructions embodied thereon; at least one processor coupled to the one or more non-transitory computer-readable media, and configured to execute the computer-executable instructions to: provide a measurement report to a target base station through a source base station, the measurement report including beam-related measurements of the target base station based on a measurement configuration provided by the target base station; communicate with the target base station based on the beam-related measurements, when the source base station decides to handover the UE to the target base station.

In an example of the second aspect, the measurement report includes at least one of a synchronization signal (SS) block index or a channel state information-resource index (CSI-RS) resource index (CRI).

In another example of the second aspect, the at least one processor is further configured to execute the computer-executable instructions to: select a preamble index and a PRACH resource; transmit a random access preamble to the target base station in the selected PRACH resource.

In another example of the second aspect, at least one of the PRACH resource or the preamble index is selected by the UE based on measurements of at least one of channel state information-resource index reference signal received power (CSI-RS-RSRP) or synchronization signal (SS) block reference signal received power (SSB-RSRP).

In another example of the second aspect, the target base station monitors the PRACH resource using a spatial domain filter that is used for transmitting at least one of an SS block index or a CRI indicated to the UE in a Handover Command.

In another example of the second aspect, the at least one processor is further configured to execute the computer-executable instructions to receive a random access response from the target base station through a downlink transmission beam.

In another example of the second aspect, the target base station transmits a Physical Downlink Shared Channel (PDSCH) for the random access response to the UE based on a spatial domain filter or quasi co-location (QCL) information.

In another example of the second aspect, the spatial domain filer or the QCL information is based on the preamble index and the PRACH resource.

In another example of the second aspect, the spatial domain filer is determined based on the random access preamble received in the PRACH resource.

In another example of the second aspect, when receiving the PDSCH for the random access response, the UE assumes that the demodulation reference signal (DM-RS) of the PDSCH is quasi co-located with the SS block or the CSI-RS resource.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 3A is a diagram illustrating a method for beam refinement during an Xn-based handover procedure with CFRA, according to an example implementation of the present application.

DETAILED DESCRIPTION

Figure 1:
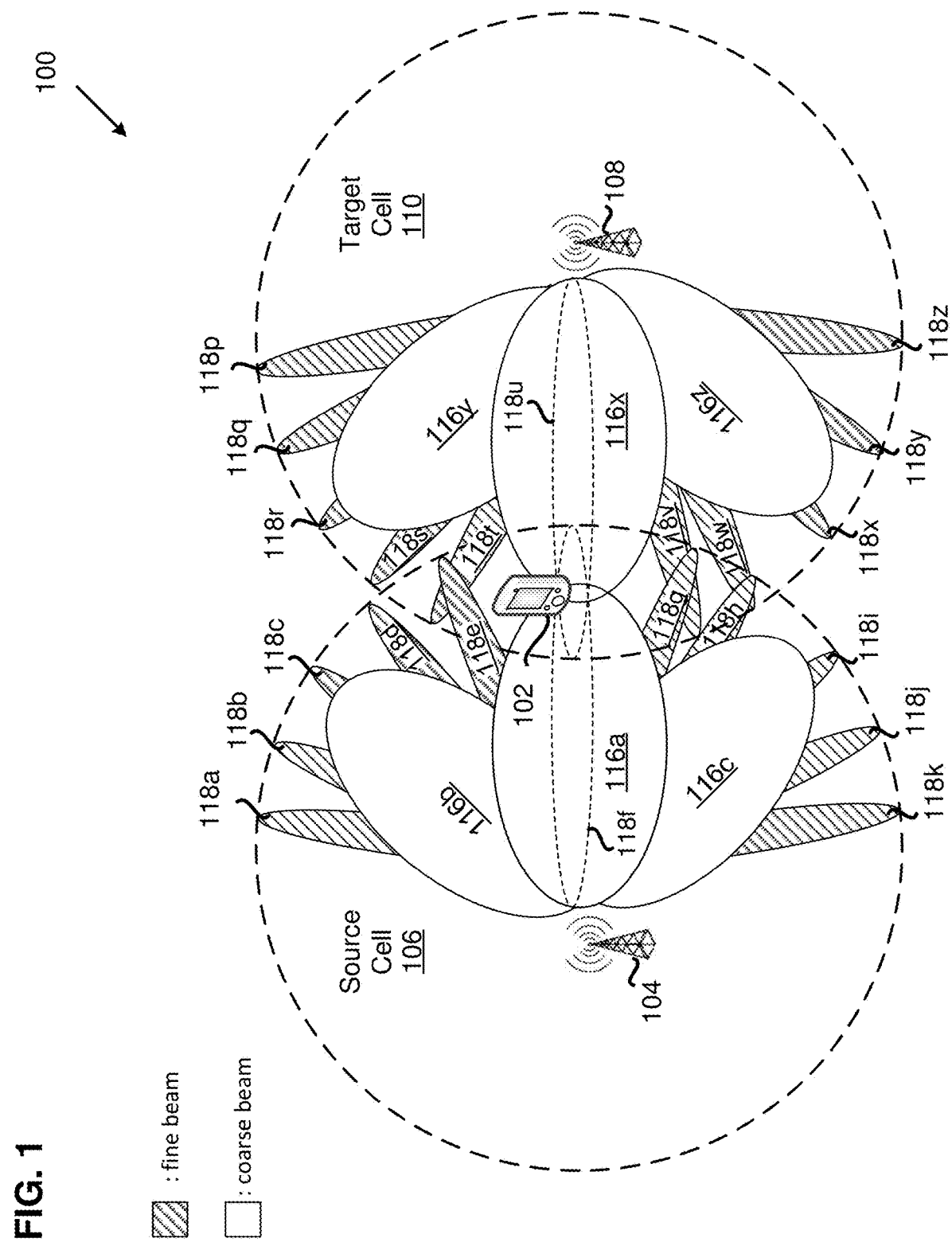
FIG. 1 is a schematic diagram of a wireless communication system in which a UE is moving from a source cell to a target cell, where the source cell and the target cell are under the control of their corresponding base stations broadcasting coarse beams and fine beams in their respective coverage areas, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internee), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). A cell may be a NR-U cell (i.e., the cell associated with unlicensed band). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

FIG. 1 is a schematic diagram of a wireless communication system in which a UE is moving from a source cell to a target cell, where the source cell and the target cell are under the control of their corresponding base stations broadcasting coarse beams and fine beams in their respective coverage areas, according to an example implementation of the present application. As shown in FIG. 1, wireless communication system 100 includes UE 102, source base station 104, and target base station 108. Each of source base station 104 and target base station 108 may be a base station (e.g., gNB) under a new radio access wireless network or a base station (e.g., eNB) under a Long Term Evolution (LTE) wireless network.

As shown in FIG. 1, source base station 104 broadcasts coarse beams 116a, 116b and 116c, and fine beams 118a, 118b, 118c, 118d, 118e, 118f, 118g, 118h, 118i, 118j and 118k in the coverage area of source cell 106. Each of coarse beams 116a, 116b and 116c partially overlaps at least one of their neighboring coarse beams. Each of fine beams 118a, 118b, 118c, 118d, 118e, 118f, 118g, 118h, 118i, 118j and 118k partially overlaps at least one of their neighboring fine beams. Also, each of coarse beams 116a, 116b and 116c overlaps several fine beams broadcast by source base station 104.

Similarly, target base station 108 broadcasts coarse beams 116x, 116y and 116z, and fine beams 118p, 118q, 118r, 118s, 118t, 118u, 118v, 118w, 118x, 118y and 118z in the coverage area of target cell 110. Each of coarse beams 116x, 116y and 116z partially overlaps at least one of their neighboring coarse beams. Each of fine beams 118p, 118g, 118r, 118s, 118t, 118u, 118v, 118w, 118x, 118y and 118z partially overlaps at least one of their neighboring fine beams. Also, each of coarse beams 116x, 116y and 116z overlaps several fine beams broadcast by target base station 108.

In one implementation, UE 102 may travel from the coverage area of source cell 106 controlled by source base station 104 to the coverage area of target cell 110 controlled by target base station 108. As shown in FIG. 1, UE 102 may be in an overlapped coverage area between source cell 106 and target cell 110, where coarse beam 116a broadcast by source base station 104 overlaps coarse beam 116x broadcast by target base station 108, and where fine beam 118f broadcast by source base station 104 overlaps fine beam 118u broadcast by target base station 108. As UE 102 moves away from source cell 106, source base station 104 may prepare for a handover procedure, for example, to transfer an ongoing session (e.g., data session) between UE 102 and source base station 104 to target base station 108.

In a conventional handover procedure, a UE would have to perform RACH procedure to establish connection with the target base station using a coarse beam. After handover, the network would need to spend more time and resources on beam alignment to search for one or more fine beams for data transmission. By contrast, implementations of the present application adopt beam refinement during handover such that during and/or immediately after handover, UE 102 may continue an ongoing data transmission with target cell 110 through fine beam 118u for example.

In legacy LTE networks, handover can be achieved by contention free random access and contention based random access. One major difference between these two kinds of random access is that a base station can configure dedicated PRACH resource to a UE during contention free random access, while during contention based random access, a UE can only use broadcasted PRACH resource by a base station during contention based random access. Since beam refinement is beneficial when applied based on dedicated resources, implementations of the present application will focus on beam refinement during handover with contention free random access (CFRA). However, it should be understood that the present invention may also be applied to handover with contention based random access.

A 5G NR wireless communication system may include handover procedures, such as an Xn-based handover procedure and an NG-based handover procedure. Certain details of these handover procedures are described in the 3GPP TR 38.801, which is incorporated by reference hereinwith in its entirety. It is noted that implementations of the present application include, but are not limited to, LTE-to-LTE, LTE-to-NR, and NR-to-NR handover cases.

Use Case 1: Xn-Based Handover with CFRA

Figure 2:
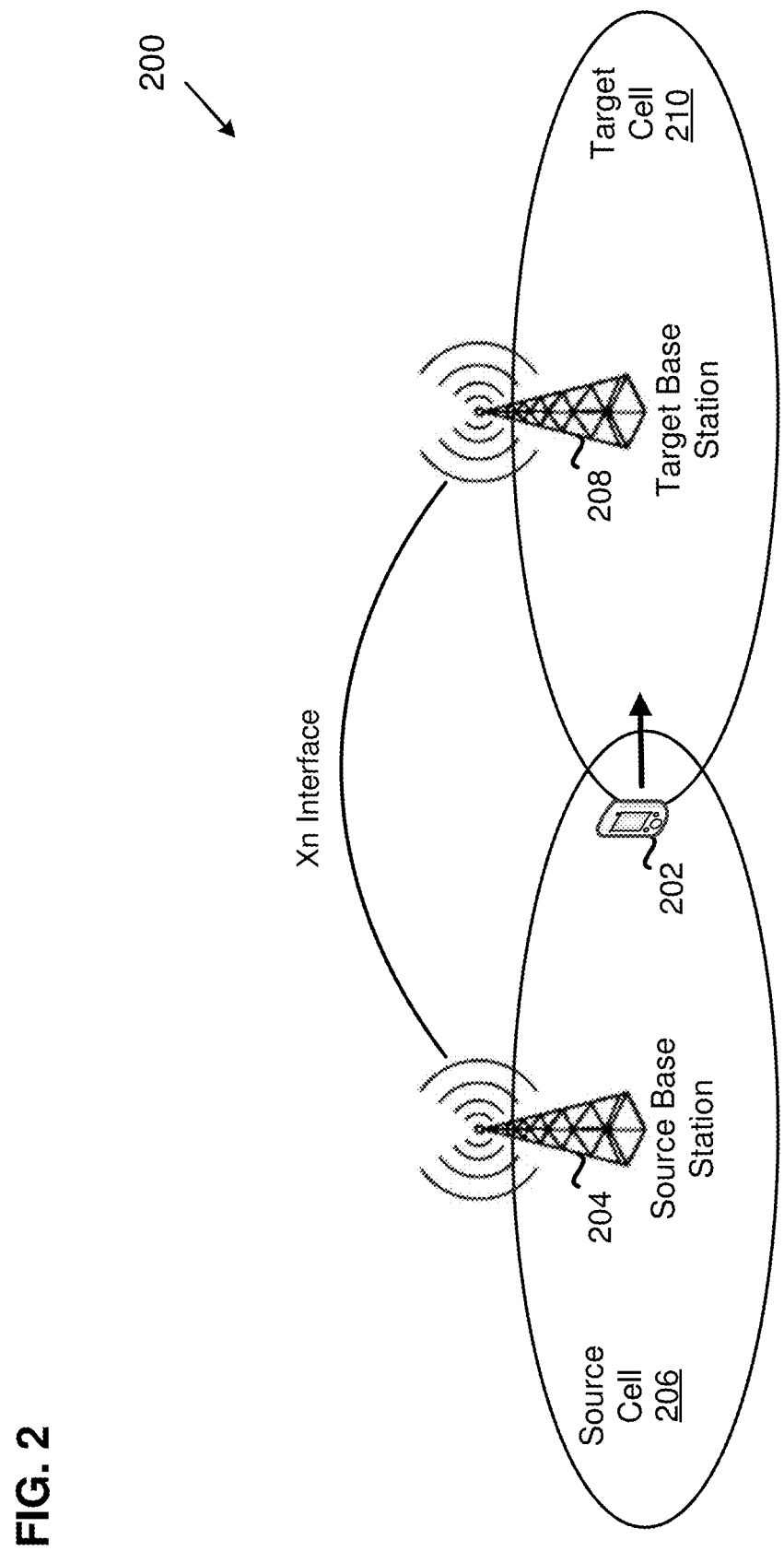
FIG. 2 is a schematic diagram illustrating an Xn-based handover with contention free random access (CFRA), according to an example implementation of the present application.

FIG. 2 is a schematic diagram illustrating an Xn-based handover with CFRA, according to an example implementation of the present application. As shown in FIG. 2, under the Xn-based architecture, wireless communication network 200 may include UE 202, source base station 204, and target base station 208. In one implementation, UE 202, source base station 204, and target base station 208 may substantially correspond to UE 102, source base station 104, and target base station 108, respectively, as shown and described with reference to FIG. 1. Each of source base station 204 and target base station 208 may be a base station (e.g., gNB) under an NR wireless network, or a base station (e.g., eNB) under an LTE wireless network. Source base station 204 and target base station 208 may communicate with each other through an Xn interface.

In the present implementation, UE 202 may travel from the coverage area of source cell 206 controlled by source base station 204 to the coverage area of target cell 210 controlled by target base station 208. As shown in FIG. 2, UE 202 may be entering an overlapped coverage area between source cell 206 and target cell 210, where one or more coarse beams broadcast by source base station 204 overlap one or more coarse beams broadcast by target base station 208, and where one or more fine beams broadcast by source base station 204 overlap one or more fine beams broadcast by target base station 208. As UE 202 moves away from source cell 206, source base station 204 may prepare for a handover procedure to transfer an ongoing data session between UE 202 and source base station 204 to target base station 208. Details of beam refinement during the Xn-based handover procedure with beam refinement will be discussed with reference to at least FIGS. 3A, 3B, 3C and 3D herein.

FIG. 3A is a diagram illustrating a method for beam refinement during an Xn-based handover procedure with CFRA, according to an example implementation of the present application. In diagram 300, a wireless communication network may include UE 302, source base station 304, and target base station 308. In one implementation, UE 302, source base station 304, and target base station 308 may substantially correspond to UE 202, source base station 204 and target base station 208, respectively, as shown and described with reference to FIG. 2. Before the handover procedure, UE 302 may be in data communication with source base station 304 as indicated in FIG. 3A.

In action 380, target base station 308 may negotiate with source base station 304 about a measurement configuration (e.g., synchronization signal (SS) configuration, channel state information-reference signal (CSI-RS) configuration, or other RS(s) for radio resource management (RRM)).

In action 381, source base station 304 may provide measurement and report configurations to UE 302 through radio resource control (RRC) signaling. The measurement and report configurations from source base station 304 may provide details to UE 302 with regard to how to measure reference signal received power (RSRP) of source base station 304's neighboring cells, including cells covered by target base station 308. The information appended in the measurement and report configurations may include measurement frequency, period and reference signal configuration. In the present implementation, the measurement configuration may include an information element (IE), which enables UE 302 to take measurements and provide a measurement report to source base station 304, where the measurement report includes a specific measurements of target base station 308.

In action 382, UE 302 may take measurements based on the measurement configuration, and provide a measurement report based on the report configuration provided by source base station 304. In the present implementation, the measurement report includes an IE that contains a specific measurement report of target base station 308. For example, according to the report configuration, when the measured RSRP of target base station 308 becomes higher than a predetermined threshold, UE 302 may take measurements of the reference signal (e.g., specified in the measurement and report configurations received in action 381) from target base station 308 based on the measurement configuration. UE 302 may then provide the specific measurements of target base station 308 in the measurement report to source base station 304. In the present implementation, the specific measurement report of target base station 308 may include, for example, details about the measured RSRP value(s) toward the specific reference signaling and other measurement information, such as the SS block index, CSI-RS resource index (CRI), and system frame number (SFN). It is noted that, as a result of UE 302 performing measurements of target base station 308, UE 302 is able to select a qualified DL RX beam for data transmission during and/or immediately following the handover procedure, while UE 302 performs measurements of target base station 308.

In action 383, after receiving the measurement report from UE 302, source base station 304 may make a handover decision on whether to hand off UE 302 based on, for example, the measurement report and RRM information.

In action 384, if source base station 304 decides to hand off UE 302 to target base station 308, source base station 304 may send a handover request message to target base station 308, to provide the necessary information to allow target base station 308 to prepare for the handover. In the present implementation, the handover request message may include UE 302's identity, source base station 304's identity and a data requirement report of UE 302. The data requirement report contains information such as data rate or data volume requirements for UE 302. In one implementation, based on the data requirement report, target base station 308 may determine whether to perform beam refinement during the handover. For instance, in the handover request message, source base station 304 may indicate the amount of data buffering on the UE side and on the source base station side (e.g., buffer status report (BSR) from UE 302 to source base station 304 and data buffer status of source base station 304). Target base station 308 may decide whether to configure either fine beam or coarse beam related PRACH and/or RACH resources based on these information. In another implementation, when the handover request does not include a data requirement report, target base station 308 (or the AMF in case of an NG-based handover) may determine whether to perform beam refinement during the handover.

In one implementation, when at least one of the data rate and data volume requirements of UE 302 is greater than or equal to a predetermined threshold (e.g., UE 302 was having a high data rate and/or high data volume transmission/reception with source base station 304 before the handover), then target base station 308 may determine that beam refinement during the handover is necessary to maintain the quality of service during and immediately following the handover, and configure fine beam related PRACH and/or RACH resources (e.g., having a preamble index and a fine beam related PRACH resource) to continue to meet the high data rate and/or high data volume requirements during and immediately following the handover. On the other hand, when the data rate or data volume requirement of UE 302 is below the predetermined threshold, then target base station 308 may determine that beam refinement during handover is not necessary, and decide to configure coarse beam related PRACH and/or RACH resources (e.g., having the preamble index and the coarse beam related PRACH resource) to conserve PRACH and RACH resources and preserve system capacity.

In addition, the handover request message may include a new IE that contains the specific measurement report of target base station 308 measured by UE 302. For example, the handover request message may include the measured RSRP value(s) toward the specific reference signaling and other measurement information, such as the SS block index, CRI and SFN. These information may provide target base station 308 with the corresponding beam information (e.g., coarse/fine beam information) to assist target base station 308 to configure the coarse beam or fine beam related PRACH and/or RACH resources in later actions.

In action 385, target base station 308 may perform admission control to configure the required resources for the handover. For example, target base station 308 may configure dedicated PRACH and/or RACH resources for CFRA according to the handover request message.

In action 386, target base station 308 may include the resource allocations (e.g., having the dedicated PRACH and/or dedicated RACH resources) in a handover request acknowledgement (ACK) message, and send the handover request ACK message to source base station 304. For example, if the data requirement report in the handover request message reveals that there is a high data rate and/or high data volume transmission between UE 302 and source base station 304, target base station 308 may decide to perform beam refinement during the handover. Target base station 308 may send resource allocation information of the fine beam related PRACH and/or RACH resources (e.g., having the preamble index and the fine beam related PRACH resource) to source base station 304 through the Handover Request Acknowledgement message. When target base station 308 determines that it is not necessary to perform beam refinement during the handover, target base station 308 may send resource allocation information of the coarse beam related PRACH and/or RACH resources (e.g., having the preamble index and the coarse beam related PRACH resource) to source base station 304 through the Handover Request Acknowledgement message. In some implementations, target base station 308 may schedule fine UL RX beam sweeping while monitoring a dedicated RACH resource in the PRACH resources, and allocate multiple dedicated RACH and/or PRACH resource sets for UE 302 to perform DL TX beam selection and UL TX beam sweeping based on the handover request message. In one implementation, the handover request ACK message may include a transparent container (e.g., having a Handover Command) to be sent to UE 302 as an RRC message to perform the handover.

In action 387, after source base station 304 receives the handover request ACK message (e.g., having a Handover Command) from target base station 308, source base station 304 may send mobility control information to UE 302 through RRC signaling (e.g., an RRCConnectionReconfiguraiton message) to request UE 302 to perform CFRA and associate with target base station 308. The mobility control information may contain one or more dedicated PRACH resource configurations and at least one dedicated RACH resource (e.g., a preamble index) from the handover request ACK message for UE 302 to communicate (e.g., perform CFRA) with target base station 308. For example, the dedicated RACH resource may include a preamble index for a random access preamble (e.g., MSG1) in action 390. In one implementation, the dedicated PRACH resource may be related to the fine UL RX beam selection of target base station 308. In one implementation, the transmission of the dedicated RACH resource from target base station 308 may assist UE 302 to perform UL TX beam refinement. In one implementation, in order to configure a suitable PRACH resource for fine UL RX beam selection, target base station 308 may first obtain coarse UL RX beam information before obtaining information on the corresponding fine beam(s), since each fine beam belongs to a fine beam set under the coverage of a coarse beam as shown in FIG. 1. In one implementation, there may be multiple PRACH resource sets in the mobility control information. UE 302 may apply different UL TX beams in different PRACH resource sets to perform UL TX beam sweeping. It is noted that, in some implementations, UE 302 may decide by itself whether to use coarse beam or fine beam for UL TX beam sweeping.

In action 388, source base station 304 may send a sequence number (SN) status transfer message to target base station 308, for example, to convey the UL packet data convergence protocol (PDCP) SN receiver status and the DL PDCP SN transmitter status of Evolved Universal Mobile Telecommunications System (UMTS) Terrestrial Radio Access Network (E-UTRAN) Radio Access Bearers (E-RABs) for which PDCP status preservation applies (e.g., for radio link control (RLC) acknowledged mode (AM)).

In action 389, source base station 304 may send a data forwarding message to target base station 308. Thereafter, upon receiving the mobility control information, UE 302 may communicate and associated (e.g., perform CFRA) with target base station 308 and access the target cell via RACH. In action 390, target base station 308 may monitor and detect a random access preamble (e.g., MSG1) from UE 302 in the RACH resource and/or PRACH resource set (e.g., the selected beam-related PRACH and/or RACH resources), and perform UL RX beam sweeping. For example, UE 302 may select the beam-related PRACH and/or RACH resources (e.g., having the preamble index and the beam-related PRACH resource) in the mobility control information, and transmit the random access preamble to target base station 308 in the selected beam-related PRACH and/or RACH resources. In one implementation, UE 302 may select at least one of the PRACH resource or the preamble index based on measurements of at least one of CSI-RS reference signal received power (CSI-RS-RSRP) or SS block reference signal received power (SSB-RSRP).

Target base station 308 may monitor the beam-related PRACH and/or RACH resources using the same spatial domain filter that is used for transmitting at least one of the SS block index or the CRI indicated to UE 302 in the Handover Command. After receiving the random access preamble (e.g., MSG1), target base station 308 may select a qualified fine UL RX beam if target base station 308 decides to perform beam refinement after receiving the handover request message in action 384. Furthermore, target base station 308 may obtain DL TX beam information based on the RACH resource and/or PRACH resource set of MSG1 transmission. The RACH resource and/or PRACH resource set may correspond to a fine DL TX beam or a coarse DL TX beam based on target base station 308's configuration. Thus, target base station 308 may obtain qualified fine DL TX beam and UL RX beam during MSG1 transmission.

In action 391, after determining the DL TX beam and UL RX beam, target base station 308 may send a random access response (e.g., MSG2) to UE 302, for example, using the selected DL TX beam. In some implementations, target base station 308 may transmit a Physical Downlink Shared Channel (PDSCH) for the random access response to UE 302 based on the spatial domain filter and/or quasi co-location (QCL) information, where the spatial domain filter and/or quasi co-location (QCL) information may be based on at least one of the random access preamble, the preamble index, or the beam-related PRACH and/or RACH resources. When receiving the PDSCH for the random access response, UE 302 may assume that the demodulation reference signal (DM-RS) of the PDSCH is quasi co-located with the SS block or the CSI-RS resource. That is, when transmitting the PDSCH for the random access response from target base station 308 to UE 302, antenna ports of the DM-RS for the random access response are quasi co-located with the SS block or the CSI-RS resource selected by UE 302 for the RACH transmission and association with at least one of the PRACH resource or the preamble index with respect to one or more large scale channel properties or spatial receive (RX) parameters. When receiving the PDSCH for the random access response, the UE assumes that the antenna ports of DM-RS (or simply DM-RS ports) of the PDSCH for the random access response transmitted from target base station 308 to UE 302 are quasi co-located from the SS block or the CSI-RS selected by UE 302 for the RACH transmission and association with at least one of the PRACH resource or the preamble index with respect to one or more large scale channel properties or spatial RX parameters. As such, MSG2 may contain UL TX beam information based on the RACH resource contained in MSG1. Once UE 302 receives MSG2, UE 302 may obtain UL TX beam information from MSG2.

Figure 3B:
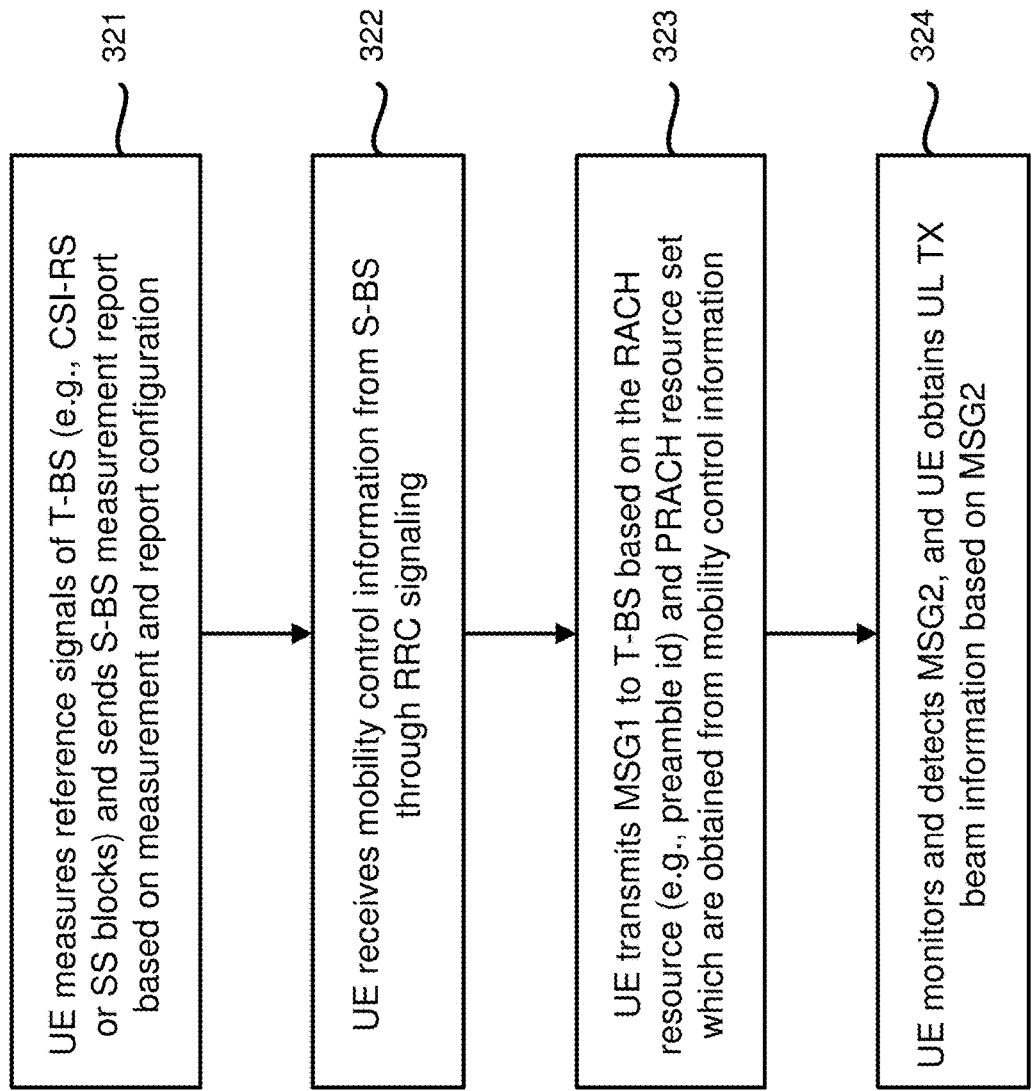
FIG. 3B is a block diagram illustrating actions taken by a UE for beam refinement during an Xn-based handover procedure with CFRA, according to an example implementation of the present application.

FIG. 3B is a block diagram illustrating actions taken by a UE for beam refinement during an Xn-based handover procedure with CFRA, according to an example implementation of the present application. In one implementation, the UE may substantially correspond to UE 302 in FIG. 3A.

As shown in FIG. 3B, in block 321, the UE may measure reference signals of a target base station (e.g., CSI-RS or SS blocks), and send a measurement report to a source base station based on measurement and report configurations. For example, with reference to FIG. 3A, UE 302 may receive the measurement and report configurations from source base station 304. UE 302 may take measurements of target base station 308 based on the measurement configuration. The measurements may include measured RSRP value(s) toward the specific reference signaling and other measurement information, such as SS block index, CRI, and SFN. UE 302 may then provide a measurement report having specific measurements of target base station 308 to source base station 304 based on the report configuration.

In block 322, the UE may receive mobility control information from the source base station through RRC signaling. For example, with reference to FIG. 3A, based on a Handover Command from target base station 308 to source base station 304, UE 302 may receive mobility control information from source base station 304 through RRC signaling (e.g., an RRCConnectionReconfiguraiton message), the mobility control information may request UE 302 to perform CFRA and associate with target base station 308.

The mobility control information may include one or more dedicated PRACH resource sets/configurations and at least one dedicated RACH resource (e.g., a preamble index) for CFRA. For example, the dedicated RACH resource may include a preamble index for a preamble (MSG1). In one implementation, the dedicated PRACH resource may be related to UL RX fine beam selection of target base station 308. In one implementation, the transmission of the dedicated RACH resource from target base station 308 may assist UE 302 to perform UL TX beam refinement. In one implementation, in order to configure a suitable PRACH resource for UL RX fine beam selection, target base station 308 may first obtain UL RX coarse beam information before obtaining information on the corresponding fine beams, since each fine beam belongs to a fine beam set under the coverage of a coarse beam as shown in FIG. 1. In one implementation, there may be multiple PRACH resource sets in the mobility control information. UE 302 may apply different UL TX beams in different PRACH resource sets to perform UL TX beam sweeping. It is noted that, in some implementations, UE 302 may decide by itself whether to use coarse beam or fine beam for UL TX beam sweeping.

In block 323, the UE may transmit a random access preamble (e.g., MSG1) to the target base station based on the RACH resource (e.g., preamble index/ID) and/or PRACH resource set which is obtained from the mobility control information. For example, with reference to FIG. 3A, upon receiving the mobility control information, UE 302 may communicate with target base station 308 by transmitting a random access preamble (e.g., MSG1) to target base station 308 based on the RACH resource and/or PRACH resource set obtained from the mobility control information.

In block 324, the UE may monitor and detect a random access response (e.g., MSG2), and obtain UL reception beam information based on the random access response. For example, with reference to FIG. 3A, UE 302 may receive a random access response (e.g., MSG2) from target base station 308. MSG2 may include UL TX beam information based on the RACH resource contained in MSG1. Once UE 302 receives MSG2, UE 302 may obtain the UL TX beam information.

Figure 3C:
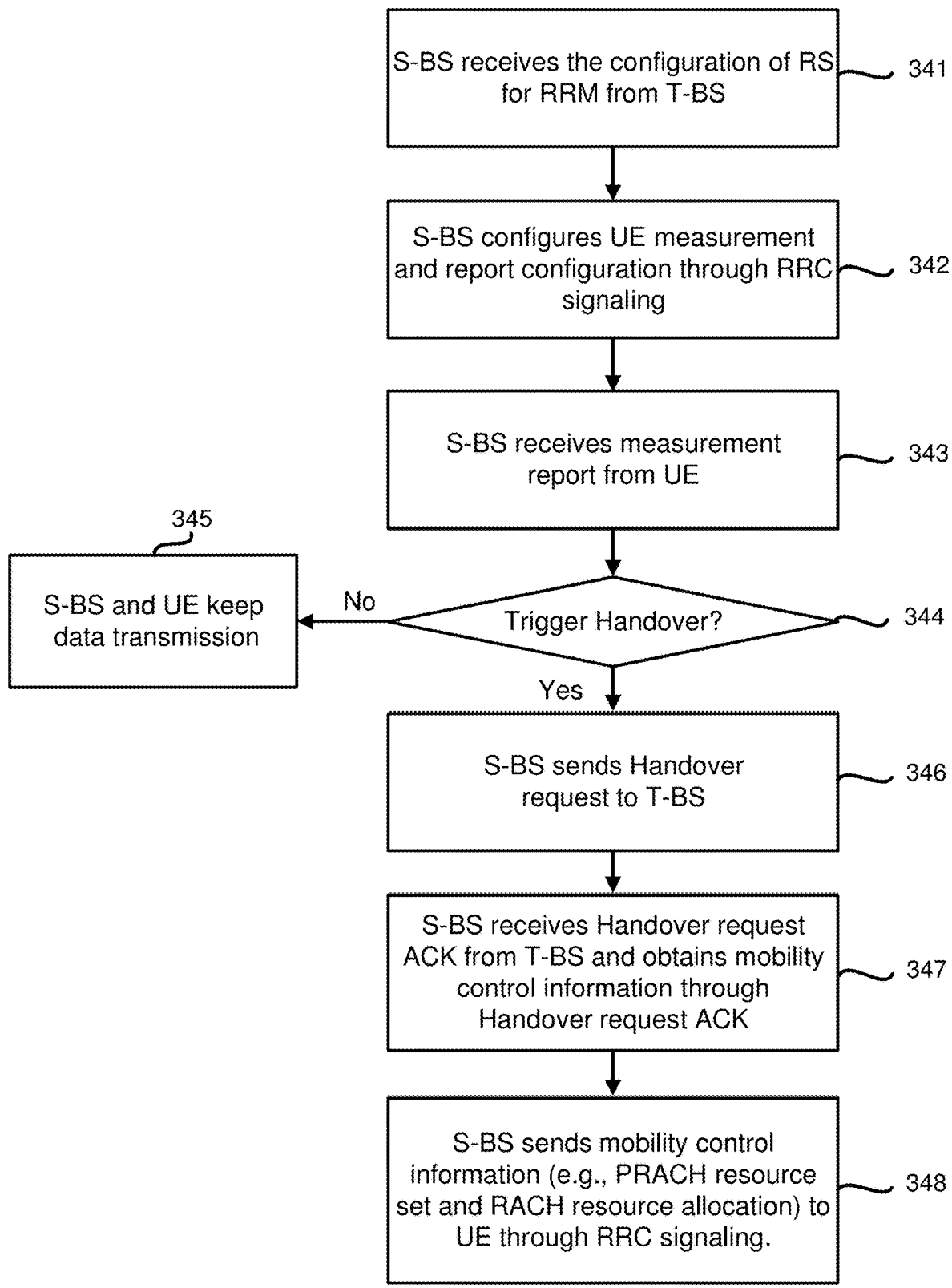
FIG. 3C is a block diagram illustrating actions taken by a source base station for beam refinement during an Xn-based handover procedure with CFRA, according to an example implementation of the present application.

FIG. 3C is a block diagram illustrating actions taken by a source base station for beam refinement during an Xn-based handover procedure with CFRA, according to an example implementation of the present application. In one implementation, the source base station may substantially correspond to source base station 304 in FIG. 3A.

As shown in FIG. 3C, in block 341, the source base station may receive the configuration of RS for radio resource management from a target base station. For example, with reference to FIG. 3A, source base station 304 may receive from target base station 308 a measurement configuration, which may include SS configuration, CSI-RS configuration, and/or other RS(s) for radio resource management.

In block 342, the source base station may configure the UE measurement and report configurations through RRC signaling. For example, with reference to FIG. 3A, source base station 304 may configure the measurement and report configurations based at least in part on the measurement configuration from target base station 308, and send the measurement and report configurations to UE 302.

In block 343, the source base station may receive the measurement report from the UE. For example, with reference to FIG. 3A, source base station 304 may receive a measurement report based on the report configuration from UE 302. The measurement report may include an IE that contains a specific measurement report of target base station 308. For example, according to the report configuration, when the measured RSRP of target base station 308 becomes higher than a predetermined threshold, UE 302 may take measurements of the reference signal (e.g., specified in the measurement and report configurations received in action 381) from target base station 308 based on the measurement configuration. UE 302 may then provide the specific measurements of target base station 308 in the measurement report to source base station 304. In the present implementation, the specific measurement report of target base station 308 may include, for example, details about the measured RSRP value(s) toward the specific reference signaling and other measurement information, such as the SS block index, CRI, and SFN.

In block 344, the source base station may decide whether to trigger handover. For example, with reference to FIG. 3A, source base station 304 may make a handover decision on whether to hand off UE 302 based on, for example, the measurement report and RRM information.

In block 345, if handover is not triggered, the source base station and UE may continue with their current data transmission. Otherwise, in block 346, the source base station may send a handover request to the target base station. For example, with reference to FIG. 3A, source base station 304 may send a handover request message to target base station 308, to provide the necessary information to allow target base station 308 to prepare for the handover. In one implementation, the handover request message may include UE 302's identity, source base station 304's identity and a data requirement report of UE 302. The data requirement report contains information such as data rate or data volume requirements for UE 302. In one implementation, based on the data requirement report, target base station 308 may determine whether to perform beam refinement during the handover. For instance, in the handover request message, source base station 304 may indicate the amount of data buffering on the UE side and on the source base station side (e.g., buffer status report (BSR) from UE 302 to source base station 304 and data buffer status of source base station 304). Target base station 308 may decide whether to configure either fine beam or coarse beam related PRACH and/or RACH resources based on these information. In another implementation, when the handover request does not include a data requirement report, target base station 308 (or the AMF in case of an NG-based handover) may determine whether to perform beam refinement during the handover.

In one implementation, when at least one of the data rate and data volume requirements of UE 302 is greater than or equal to a predetermined threshold (e.g., UE 302 was having a high data rate and/or high data volume transmission/reception with source base station 304 before the handover), then target base station 308 may determine that beam refinement during the handover is necessary to maintain the quality of service during and immediately following the handover, and configure fine beam related PRACH and RACH resources to continue to meet the high data rate and/or high data volume requirements during and immediately following the handover. On the other hand, when the data rate or data volume requirement of UE 302 is below the predetermined threshold, then target base station 308 may determine that beam refinement during handover is not necessary, and decide to configure coarse beam related PRACH and/or RACH resources to conserve PRACH and RACH resources and preserve system capacity.

In addition, the handover request message may include a new IE that contains the specific measurement report of target base station 308 measured by UE 302. For example, the handover request message may include the measured RSRP value(s) toward the specific reference signaling and other measurement information, such as the SS block index, CRI and SFN. These information may provide target base station 308 with the corresponding beam information (e.g., coarse/fine beam information) to assist target base station 308 to configure the coarse/fine beam related PRACH and/or RACH resources in later actions.

In block 347, the source base station may receive a handover request ACK message from the target base station, and obtains mobility control information through the handover request ACK message. For example, with reference to FIG. 3A, source base station 304 may receive a handover request ACK message having resource allocations such as dedicated PRACH and/or dedicated RACH resources. For example, if the data requirement report in the handover request message reveals that there is a high data rate and/or high data volume transmission between UE 302 and source base station 304, target base station 308 may decide to perform beam refinement during the handover. For example, target base station 308 may schedule fine UL RX beam sweeping while monitoring a dedicated RACH resource in the PRACH resources, and allocate multiple dedicated RACH and/or PRACH resource sets for UE 302 to perform DL TX beam selection and UL TX beam sweeping based on the handover request message. In one implementation, the handover request ACK message may include a transparent container (e.g., having a Handover Command) to be sent to UE 302 as an RRC message to perform the handover.

In block 348, the source base station may send mobility control information (e.g., PRACH resource set and RACH resource allocation) to the UE through RRC signaling. For example, with reference to FIG. 3A, source base station 304 may receive the handover request ACK message (e.g., having a Handover Command) from target base station 308), source base station 304 may send mobility control information, based on the Handover Command sent from target base station 308 to source base station 304, to UE 302 through RRC signaling (e.g., an RRCConnectionReconfiguraiton message) to request UE 302 to perform CFRA and associate with target base station 308. The mobility control information may contain one or more dedicated PRACH resource configurations and at least one dedicated RACH resource a preamble index) from the handover request ACK message to perform CFRA. For example, the dedicated RACH resource may include a preamble index for a preamble (MSG1) in action 390. In one implementation, the dedicated PRACH resource may be related to UL RX fine beam selection of target base station 308. In one implementation, the transmission of the dedicated RACH resource from target base station 308 may assist UE 302 to perform UL TX beam refinement. In one implementation, in order to configure a suitable PRACH resource for UL RX fine beam selection, target base station 308 may first obtain UL RX coarse beam information before obtaining information on the corresponding fine beams, since each fine beam belongs to a fine beam set under the coverage of a coarse beam as shown in FIG. 1. In one implementation, source base station 304 may send multiple PRACH resource sets in the mobility control information, so as to allow UE 302 to apply different UL TX beams in different PRACH resource sets to perform UL TX beam sweeping.

Figure 3D:
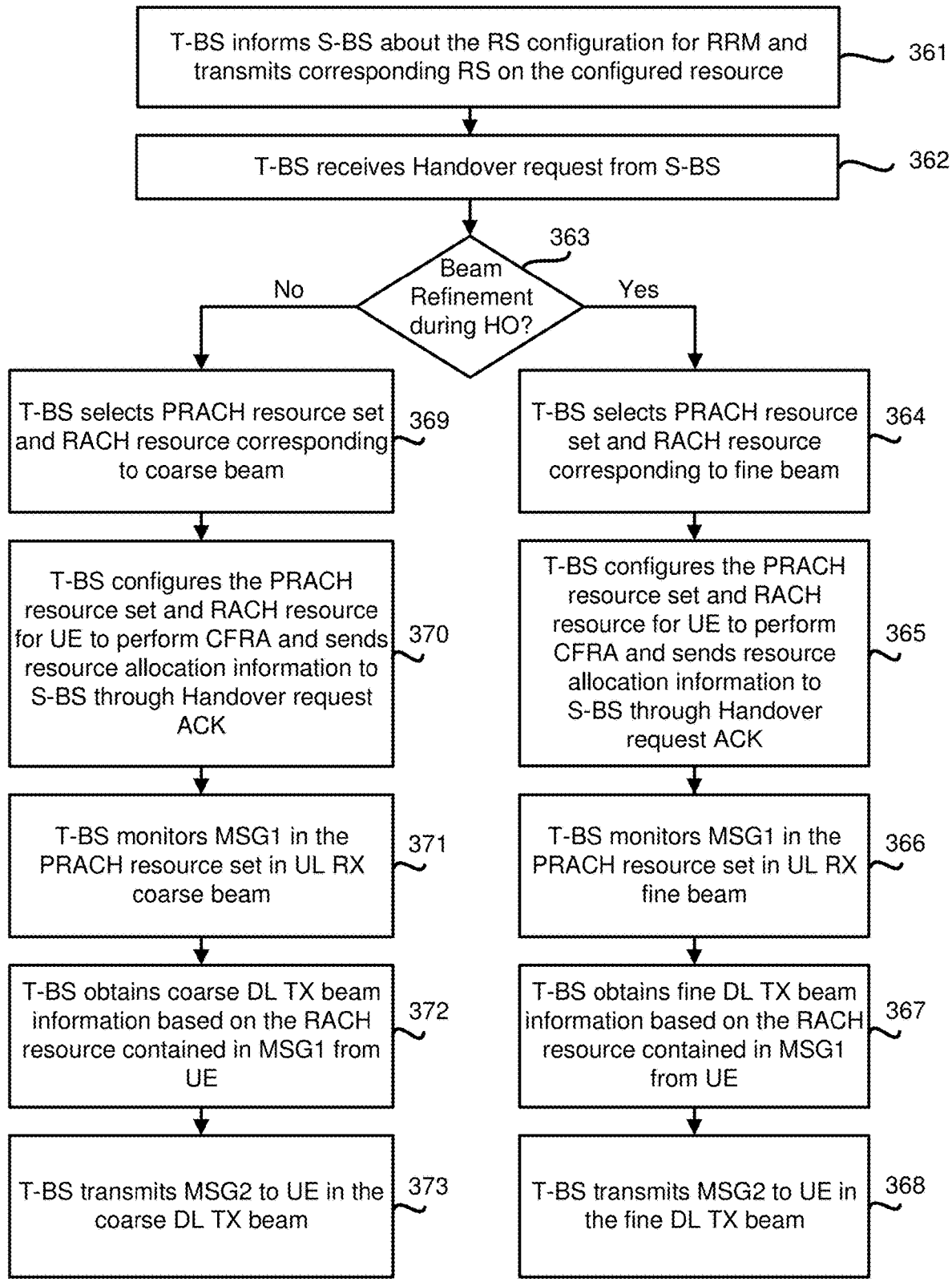
FIG. 3D is a block diagram illustrating actions taken by a target base station for beam refinement during an Xn-based handover procedure with CFRA, according to an example implementation of the present application.

FIG. 3D is a block diagram illustrating actions taken by a target base station for beam refinement during an Xn-based handover procedure with CFRA, according to an example implementation of the present application. In one implementation, the target base station may substantially correspond to target base station 308 in FIG. 3A.

As shown in FIG. 3D, in block 361, the target base station may inform the source base station about the RS configuration for RRM and transmit corresponding RS on the configured resource. For example, with reference to FIG. 3A, target base station 308 may negotiate with source base station 304 about a measurement configuration (e.g., SS configuration, CSI-RS configuration, or other RS(s) for radio resource management (RRM)).

In block 362, the target base station may receive a handover request from the source base station. For example, with reference to FIG. 3A, target base station 308 may receive a handover request message from source base station 304, where the handover request message provides the necessary information to allow target base station 308 to prepare for the handover. In one implementation, the handover request message may include UE 302's identity, source base station 304's identity and a data requirement report of UE 302. The data requirement report contains information such as data rate or data volume requirements for UE 302.

In addition, the handover request message may include a new IF that contains the specific measurement report of target base station 308 measured by UE 302. For example, the handover request message may include the measured RSRP value(s) toward the specific reference signaling and other measurement information, such as the SS block index, CRI and SFN. These information may provide target base station 308 with the corresponding beam information (e.g., coarse/fine beam information) to assist target base station 308 to configure the coarse/fine beam related PRACH and/or RACH resources in later actions.

In block 363, the target base station may decide whether to trigger beam refinement during handover based on the data requirement report. For example, with reference to FIG. 3A, target base station 308 may decide whether to configure either fine beam or coarse beam related PRACH and/or RACH resources based on the handover request message from the source base station 304. In one implementation, based on the data requirement report, target base station 308 may determine whether to perform beam refinement during the handover. For example, in the handover request message, source base station 304 may indicate the amount of data buffering on the UE side and on the source base station side (e.g., buffer status report (BSR) from UE 302 to source base station 304 and data buffer status of source base station 304). Target base station 308 may decide whether to configure either fine beam or coarse beam related PRACH and/or RACH resources based on these information.

If beam refinement during handover is triggered in block 363, the target base station may perform blocks 364 through 368. Otherwise, the target base station may perform blocks 369 through 373.

In block 364, the target base station may select fine beam related PRACH and/or RACH resources. For example, with reference to FIG. 3A, when at least one of the data rate and data volume requirements of UE 302 is greater than or equal to a predetermined threshold (e.g., UE 302 was having a high data rate and/or high data volume transmission/reception with source base station 304 before the handover), then target base station 308 may determine that beam refinement during the handover is necessary to maintain the quality of service during and immediately following the handover, and select fine beam related PRACH and/or RACH resources to continue to meet the high data rate and/or high data volume requirements during and immediately following the handover.

In block 365, the target base station may configure the PRACH resource set and RACH resource for the UE to perform CFRA, and send resource allocation information to the source base station through a handover request ACK message. For example, with reference to FIG. 3A, target base station 308 may configure dedicated PRACH and/or dedicated RACH resources for UE 302 to perform CFRA, and send the resource allocations in a handover request ACK to source base station 304. In one implementation, target base station 308 may schedule fine UL RX beam sweeping while monitoring a dedicated RACH resource in the PRACH resources, and allocate multiple dedicated RACH and/or PRACH resource sets for UE 302 to perform DL TX beam selection and UL TX beam sweeping based on the handover request message. In one implementation, the handover request ACK message may include a transparent container (e.g., having a Handover Command) to be sent to UE 302 as an RRC message to perform the handover.

In block 366, the target base station may monitor MSG1 in the PRACH resource set in fine UL RX beam. For example, with reference to FIG. 3A, target base station 308 may monitor and detect a random access preamble (e.g., MSG1) from UE 302 in the RACH resource and/or PRACH resource set, and perform UL RX beam sweeping.

In block 367, the target base station may obtain fine DL transmission beam information based on the RACH resource contained in MSG1 from the UE. For example, with reference to FIG. 3A, after receiving MSG1, target base station 308 may select a qualified UL RX fine beam. In addition, target base station 308 may obtain fine DL TX beam information based on the RACH resource and/or PRACH resource set contained in MSG1 from UE 302. The RACH resource and/or PRACH resource set may correspond to a fine DL TX beam based on target base station 308's configuration. Thus, target base station 308 may obtain qualified fine DL TX beam and UL RX beam.

In block 368, the target base station may transmit MSG2 to the UE in the fine DL TX beam. For example, with reference to FIG. 3A, after determining the DL TX beam and UL RX beam, target base station 308 may send a random access response (e.g., MSG2) to UE 302, for example, using the selected DL TX beam. MSG2 may contain fine UL TX beam information based on the RACH resource contained in MSG1. Once UE 302 receives MSG2, UE 302 may obtain fine UL TX beam information from MSG2.

If beam refinement during handover is not triggered in block 363, the target base station performs blocks 369 through 373.

In block 369, the target base station may select coarse beam related PRACH and/or RACH resources. For example, with reference to FIG. 3A, when the data rate or data volume requirement of UE 302 is below the predetermined threshold, then target base station 308 may determine that beam refinement during handover is not necessary, and decide to configure coarse beam related PRACH and/or RACH resources to conserve PRACH and RACH resources and preserve system capacity.

In block 370, the target base station may configure the PRACH resource set and RACH resource for the UE to perform CFRA, and send resource allocation information to the source base station through the handover request ACK message. In block 371, the target base station may monitor MSG1 in the PRACH resource set in UL reception coarse beam. In block 372, the target base station may obtain coarse DL TX beam information based on the RACH resource contained in MSG1 from the UE. In block 373, the target base station may transmit MSG2 to the UE in the coarse DL transmission beam. It should be noted that blocks 369, 370, 371, 372, and 373 may be similar to blocks 364, 365, 366, 367, and 368, respectively, except that coarse beam related PRACH and/or RACH resources, and coarse beams are selected, configured, allocated, monitored, obtained, transmitted, and/or used in blocks 369, 370, 371, 372, and 373.

Use Case 2: NG-Based Handover with CFRA

Figure 4:
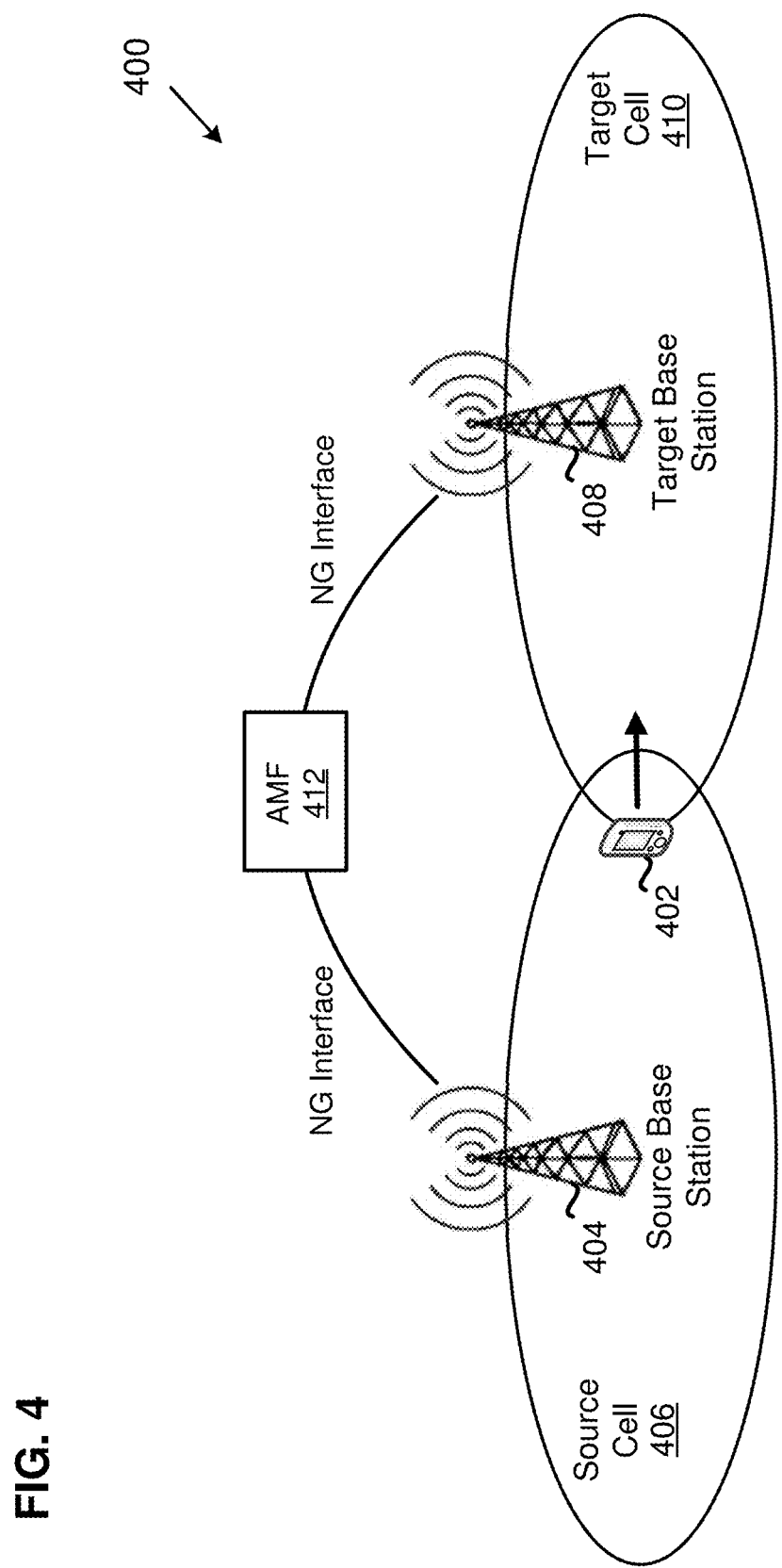
FIG. 4 is a schematic diagram illustrating a Next Generation (NG) based handover with CFRA, according to an example implementation of the present application.

FIG. 4 is a schematic diagram illustrating an NG based handover with CFRA, according to an example implementation of the present application. As shown in FIG. 4, under the next generation (e.g., 5G) architecture, NG wireless communication network 400 may include UE 402, source base station 404, target base station 408, and access and mobility management function (AMF) 412. Each of source base station 404 and target base station 408 may be a base station (e.g., gNB) under a new radio access wireless network. In one implementation, UE 402, source base station 404, and target base station 408 may substantially correspond to UE 102, source base station 104, and target base station 108, respectively, as shown and described with reference to FIG. 1. AMF 412 is configured to manage access control and mobility. AMF 412 may also include network slice selection functionalities. As shown in FIG. 4, AMF 412 is coupled to each of source base station 404 and target base station 408 through an NG interface. In an NG-based handover procedure, source base station 404 may rely on AMF 512 (similar to MME in LTE) to send the handover request to target base station 408.

In the present implementation, UE 402 may travel from the coverage area of source cell 406 controlled by source base station 404 to the coverage area of target cell 410 controlled by target base station 408. As shown in FIG. 4, UE 402 may be entering an overlapped coverage area between source cell 406 and target cell 410, where one or more coarse beams broadcast by source base station 404 overlap one or more coarse beams broadcast by target base station 408, and where one or more fine beams broadcast by source base station 404 overlap one or more fine beams broadcast by target base station 408. As UE 402 moves away from source cell 406, source base station 404 may prepare for a handover procedure to transfer an ongoing data session between UE 402 and source base station 404 to target base station 408 through AMF 412. Details of beam refinement during an NG-based handover procedure with CFRA will be discussed with reference to FIGS. 5A, 5B, 5C, 5D and 5E below.

Figure 5A:
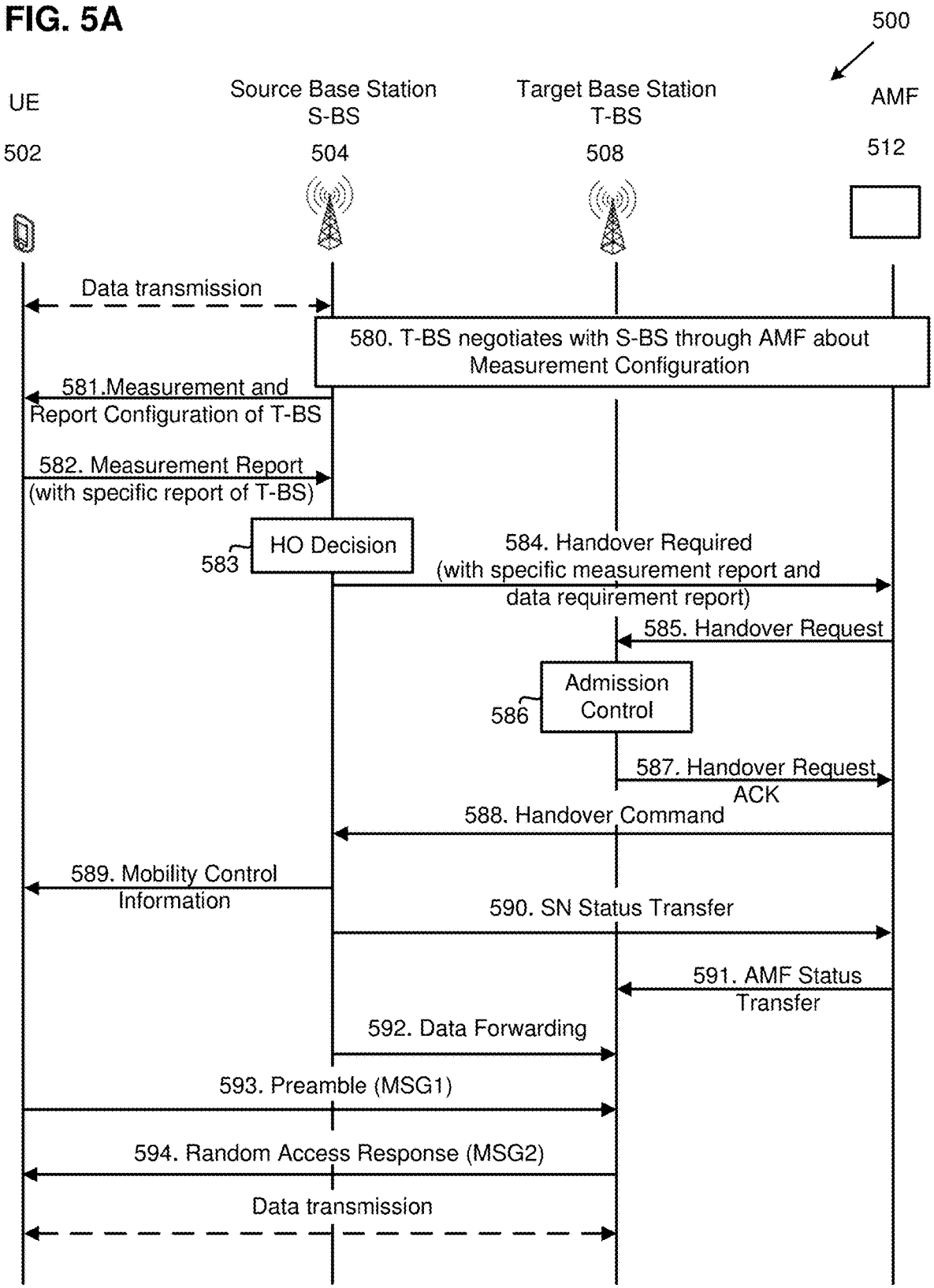
FIG. 5A is a diagram illustrating a method for beam refinement during an NG-based handover procedure with CFRA, according to an example implementation of the present application.

FIG. 5A is a diagram illustrating a method for beam refinement during an NG-based handover procedure with CFRA, according to an example implementation of the present application. In diagram 500, a wireless communication network may include UE 502, source base station 504, target base station 508, and AMF 512. In the present implementation, UE 502, source base station 504, target base station 508, and AMF 512 may substantially correspond to UE 402, source base station 404, target base station 408, and AMF 412, respectively, as shown and described with reference to FIG. 4. Before the handover procedure, UE 502 may be in data communication with source base station 504 as indicated in FIG. 5A.

In action 580, target base station 508 may negotiate with source base station 504 through AMF 512 about a measurement configuration (e.g., SS configuration, CSI-RS configuration, or other RS(s) for RRM). For example, AMF 512 may receive a measurement configuration for RRM from target base station 508. AMF 512 may then send the measurement configuration for RRM to source base station 504.

In action 581, source base station 504 may provide the measurement and report configuration to UE 502 through radio resource control (RRC) signaling. The measurement and report configurations from source base station 504 may provide details to UE 502 with regard to how to measure RSRP of source base station 504's neighboring cells, including cells covered by target base station 508. The information appended in the measurement and report configurations may include measurement frequency, period and reference signal configuration. In the present implementation, the measurement configuration may include an IE, which enables UE 502 to take measurements and provide a specific measurement report of target base station 508 in a measurement report in action 582.

In action 582, UE 502 may take measurements and provide the measurement report based on the report configuration provided by source base station 504. In the present implementation, the measurement report includes an IL that contains the specific measurement report of target base station 508. For example, according to the report configuration, when the measured RSRP of target base station 508 becomes higher than a predetermined threshold, UE 502 may take measurements of the reference signal (e.g., specified in the measurement and report configuration in action 581) from target base station 508 based on the measurement configuration. UE 502 may then provide a specific measurement report of target base station 508 in the measurement report to source base station 504. In the present implementation, the specific measurement report of target base station 508 may include details about the measured RSRP value(s) toward the specific reference signaling and other measurement information, such as the SS block index, CRI and SFN. It is noted that UE 502 can select a qualified DL RX beam for data transmission during and/or immediately the handover procedure, while UE 502 performs measurements of target base station 508.

In action 583, after receiving the measurement report from UE 502, source base station 504 may make a handover decision on whether to hand off UE 502 based on, for example, the measurement report and RRM information.

In action 584, if source base station 504 decides to hand off UE 502 to target base station 508, source base station 504 may send a handover required message to AMF 512, to provide the necessary information to allow AMF 512 and target base station 508 to prepare for the handover.

In action 585, AMF 512 may send the handover request message to target base station 508 to provide the necessary information to allow target base station 508 to prepare for the handover. In the present implementation, the handover request message may contain UE 502's identity, source base station 504's identity and a data requirement report of UE 502. The data requirement report contains information such as data rate or data volume requirements for UE 502. In one implementation, based on the data requirement report, target base station 508 may determine whether to perform beam refinement during the handover. For instance, in the handover request message, source base station 504 may indicate the amount of data buffering on the UE side and on the source base station side (e.g., BSR from UE 502 to source base station 504 and data buffer status of source base station 504). Target base station 508 may decide whether to configure either fine beam or coarse beam related PRACH and/or RACH resources based on these information. In another implementation, when the handover request does not include a data requirement report, AMF 512 may determine whether to perform beam refinement during the handover.

In one implementation, when at least one of the data rate and data volume requirements of UE 502 is greater than or equal to a predetermined threshold (e.g., UE 502 was having a high data rate and/or high data volume transmission/reception with source base station 504 before the handover), then target base station 508 may determine that beam refinement during handover is necessary to maintain the quality of service during and/or immediately following the handover, and configure fine beam related PRACH and/or RACH resources (e.g., having a preamble index and a fine beam related PRACH resource) to continue to meet the high data rate and/or high data volume requirements during and immediately following the handover. On the other hand, when the data rate or data volume requirement of UE 502 is below the predetermined threshold, then target base station 508 may determine that beam refinement during handover is not necessary, and decide to configure coarse beam related PRACH and/or RACH resources (e.g., having a preamble index and a coarse beam related PRACH resource) to conserve PRACH and RACH resources and preserve system capacity.

In addition, the handover request message may include a new IF that contains the specific measurement report of target base station 508 measured by UE 502. For example, the handover request message may include the measured RSRP value(s) toward the specific reference signaling and other measurement information, such as the SS block index, CRI and SFN. These information may provide target base station 508 with the corresponding beam information (e.g., coarse/fine beam information) to assist target base station 508 to configure the coarse beam or fine beam related PRACH and/or RACH resources in later actions.

In action 586, target base station 508 may perform admission control to configure the required resources for the handover. For example, target base station 508 may configure dedicated PRACH and/or RACH resources for CFRA according to the handover request message.

In action 587, target base station 508 may include these resource allocations (e.g., having the dedicated PRACH and/or RACH resources) in a handover request ACK message, and send the handover request ACK message to AMF 512. In action 588, AMF 512 may send a Handover Command to source base station 504, where the Handover Command may include any and all of the resource allocation information in the handover request ACK message from target base station 508. For example, if the data requirement report in the handover request message reveals that there is high data rate and/or high data volume transmission between UE 502 and source base station 504, target base station 508 may decide to perform beam refinement during the handover procedure.

Target base station 508 may send resource allocation information of the fine beam related PRACH and/or RACH resources (e.g., having the preamble index and the fine beam related PRACH resource) to AMF 512 through the Handover Request Acknowledgement message. When target base station 508 determines that it is not necessary to perform beam refinement during the handover, target base station 508 may send resource allocation information of the coarse beam related PRACH and/or RACH resources (e.g., having the preamble index and the coarse beam related PRACH resource) to AMF 512 through the Handover Request Acknowledgement message. In some implementations, to perform beam refinement during the handover, target base station 508 may schedule fine UL RX beam sweeping while monitoring dedicated RACH resource in the PRACH resources, and allocate multiple dedicated RACH resources and/or PRACH resource set for UE 502 to perform DL TX beam selection and UL TX beam sweeping based on, for example, the measurement results from the handover request message. In one implementation, the handover request ACK message may include a transparent container (e.g., having the Handover Command) to be sent to UE 502 as an RRC message to perform the handover.

In action 589, after source base station 504 receives the Handover Command from AMF 512, source base station 504 may send mobility control information to UE 502 through RRC signaling (e.g., an RRCConnectionReconfiguraiton message) to request UE 502 to perform CFRA and associate with target base station 508. The mobility control information may contain the dedicated PRACH resource configurations and at least one dedicated RACH resource (e.g., the preamble index) from the handover request ACK message. For example, the dedicated RACH resource may include a preamble index for a random access preamble (e.g., MSG1) in action 593. In one implementation, the dedicated PRACH resource configurations may be related to the fine UL RX beam selection of target base station 508. In one implementation, the transmission of dedicated RACH resource from target base station 508 may assist UE 502 to perform UL TX beam refinement. In one implementation, in order to configure a suitable PRACH resource for fine UL RX beam selection, target base station 508 may first obtain coarse UL RX beam information before obtaining information on the corresponding fine beam(s), since each fine beam belongs to a fine beam set under the coverage of a coarse beam as shown in FIG. 1. In one implementation, there may be multiple PRACH resource sets in the mobility control information. UE 502 may apply different UL TX beams in different PRACH resource sets to perform UL TX beam sweeping. It is noted that, in some implementations, UE 502 may decide by itself whether to use coarse beam or fine beam for UL TX beam sweeping.

In action 590, source base station 504 may send an SN status transfer message to AMF 512. In action 591, AMF 512 may send an AMF status transfer message to target base station 508, for example, to convey the UL PDCP SN receiver status and the DL PDCP SN transmitter status of E-RABs for which PDCP status preservation applies (e.g., for RLC AM). In action 592, source base station 504 may send a data forwarding message to target base station 508. Thereafter, upon receiving the mobility control information, UE 502 may perform synchronization to target base station 508 and access the target cell via RACH.

In action 593, target base station 508 may monitor and detect a random access preamble (e.g., MSG1) from UE 502 in the RACH resource and/or PRACH resource set (e.g., the selected beam-related PRACH and/or RACH resources), and perform UL RX beam sweeping. For example, UE 502 may select the beam-related PRACH and/or RACH resources (e.g., having the preamble index and the PRACH resource) in the mobility control information, and transmit the random access preamble to target base station 508 in the selected beam-related PRACH and/or RACH resources. In one implementation, UE 502 may select at least one of the PRACH resource or the preamble index based on measurements of at least one of CSI-RS reference signal received power (CSI-RS-RSRP) or SS block reference signal received power (SSB-RSRP).

Target base station 508 may monitor the beam-related related PRACH and/or RACH resources using the same spatial domain filter that is used for transmitting at least one of the SS block index or the CRI indicated to UE 502 in the Handover Command. After receiving the random access preamble (e.g., MSG1), target base station 508 may select a qualified fine UL RX beam if target base station 508 decides to perform beam refinement after receiving the handover request message in action 585. Furthermore, target base station 508 may obtain DL TX beam information based on the RACH resource and/or PRACH resource set of MSG1 transmission. The RACH resource and/or PRACH resource set may correspond to a fine DL TX beam or a coarse DL TX beam based on target base station 508's configuration in action 585. Thus, target base station 508 may obtain qualified fine DL TX beam and UL RX beam during MSG1 transmission.

In action 594, after determining DL TX beam and UL RX beam, target base station 508 may send a random access response (e.g., MSG2) to UE 502, for example, using the selected DL TX beam. In some implementations, target base station 508 may transmit a Physical Downlink Shared Channel (PDSCH) for the random access response to UE 502 based on the spatial domain filter and/or quasi co-location (QCL) information, where the spatial domain filter and/or quasi co-location (QCL) information may be based on at least one of the random access preamble, the preamble index, or the beam-related related PRACH and/or RACH resources. When receiving the PDSCH for the random access response, UE 502 may assume that the demodulation reference signal (DM-RS) of the PDSCH is quasi co-located with the SS block or the CSI-RS resource. That is, when transmitting the PDSCH for the random access response from target base station 508 to UE 502, antenna ports of the DM-RS for the random access response are quasi co-located with the SS block or the CSI-RS resource selected by UE 502 for the RACH transmission and association with at least one of the PRACH resource or the preamble index with respect to one or more large scale channel properties or spatial receive (RX) parameters. When receiving the PDSCH for the random access response, the UE assumes that the antenna ports of DM-RS of the PDSCH for the random access response transmitted from target base station 508 to UE 502 are quasi co-located from the SS block or the CSI-RS selected by UE 502 for the RACH transmission and association with at least one of the PRACH resource or the preamble index with respect to one or more large scale channel properties or spatial RX parameters. As such, MSG2 may contain UL TX beam information based on the RACH resource contained in MSG1. Once UE 502 receives MSG2, UE 502 may obtain UL TX beam information from MSG2.

Figure 5B:
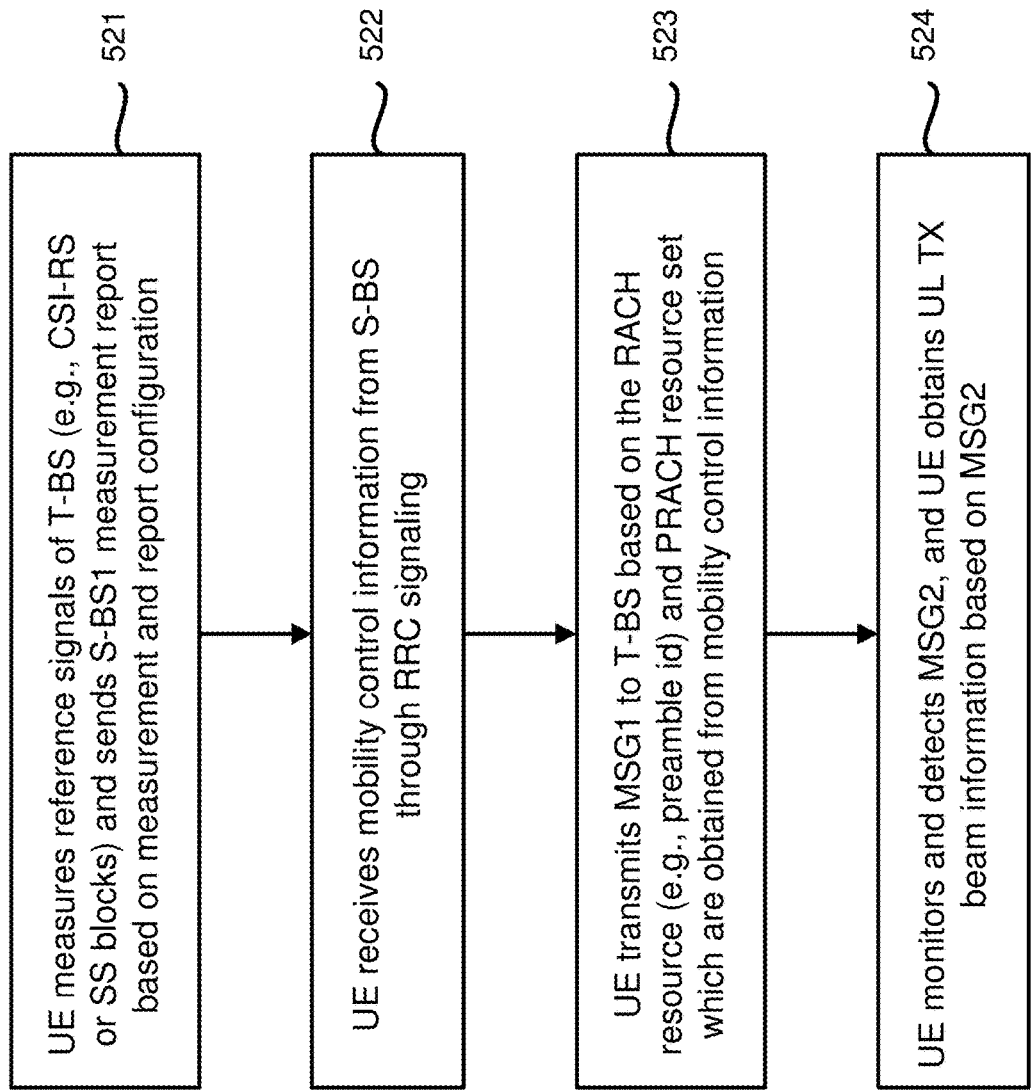
FIG. 5B is a block diagram illustrating actions taken by a UE for beam refinement during an NG-based handover procedure with CFRA, according to an example implementation of the present application.

FIG. 5B is a block diagram illustrating actions taken by a UE for beam refinement during an NG-based handover procedure with CFRA, according to an example implementation of the present application. In one implementation, the UE may substantially correspond to UE 502 in FIG. 5A. In one implementation, blocks 521, 522, 523, and 524 in FIG. 5B may be substantially similar to blocks 321, 322, 323, and 324, respectively, in FIG. 3B.

As shown in FIG. 5B, in block 521, the UE may measure reference signals of a target base station (e.g., CSI-RS or SS blocks), and send a measurement report to a source base station based on measurement and report configurations. In block 522, the UE may receive mobility control information from the source base station through RRC signaling. In block 523, the UE may transmit a random access preamble (e.g., MSG1) to the target base station based on the RACH resource (e.g., preamble index/ID) and/or PRACH resource set which is obtained from the mobility control information. In block 524, the UE may monitor and detect a random access response (e.g., MSG2), and obtain UL reception beam information based on the random access response.

Figure 5C:
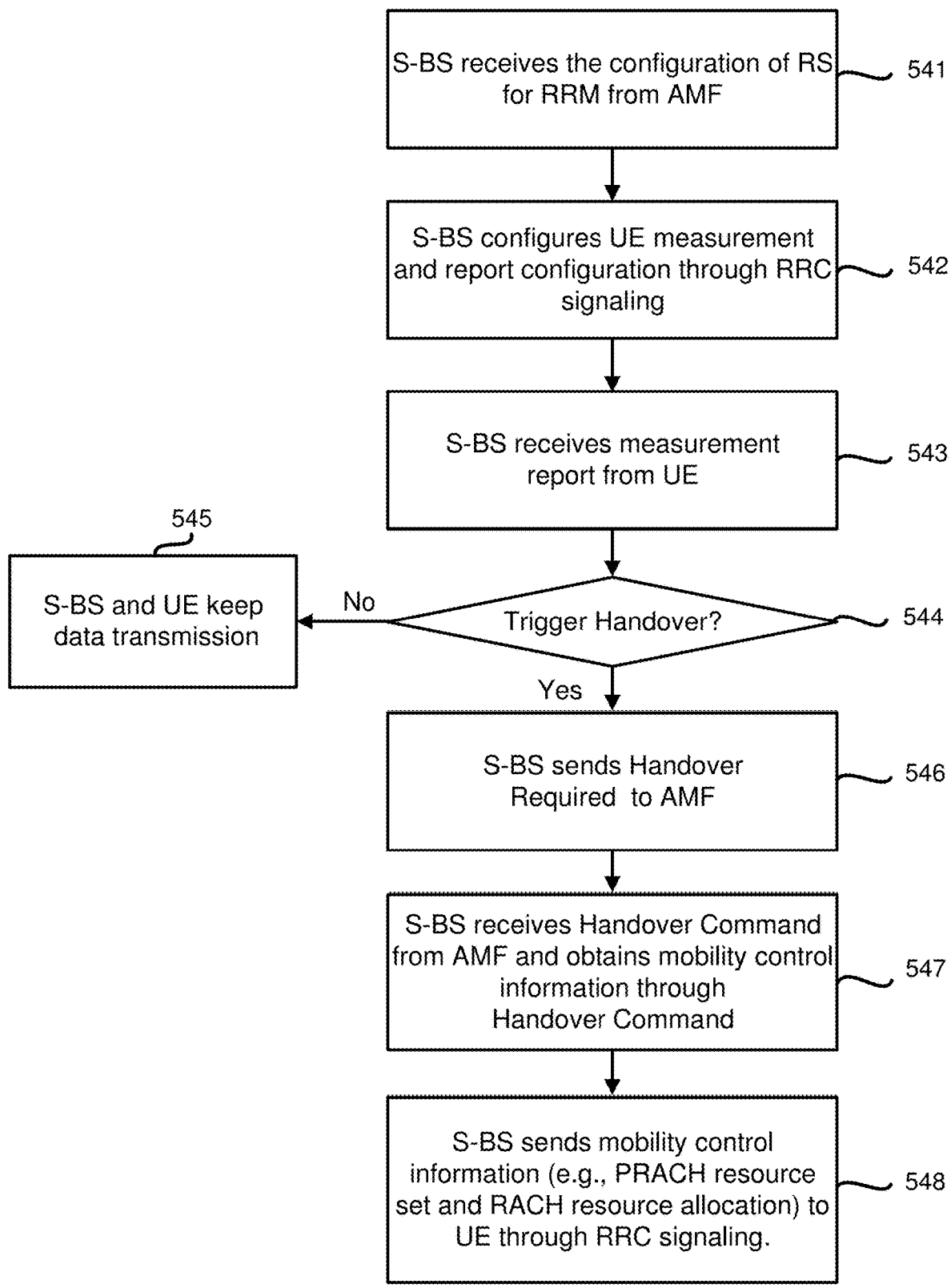
FIG. 5C is a block diagram illustrating actions taken by a source base station for beam refinement during an NG-based handover procedure with CFRA, according to an example implementation of the present application.

FIG. 5C is a block diagram illustrating actions taken by a source base station for beam refinement during an NG-based handover procedure with CFRA, according to an example implementation of the present application. In one implementation, the source base station may substantially correspond to source base station 504 in FIG. 5A. In one implementation, blocks 541, 542, 543, 544, 545, 546, 547, and 548 in FIG. 5C may be substantially similar to blocks 341, 342, 343, 344, 345, 346, 347, and 348, respectively, in FIG. 3C. Among the differences, in FIG. 5C, the source base station communicates with the target base station through an AMF.

As shown in FIG. 5C, in block 541, the source base station may receive the configuration of RS for RRM from the AMF. In block 542, the source base station may configure the UE measurement and report configurations through RRC signaling. In block 543, the source base station may receive the measurement report from the UE. In block 544, the source base station may decide whether to trigger handover. In block 545, if handover is not triggered, the source base station and UE may continue with their current data transmission. Otherwise, in block 546, the source base station may send a handover required message to the AMF. In block 547, the source base station receives a Handover Command from the AMF, and obtain mobility control information through the Handover Command. In block 548, the source base station may send mobility control information (e.g., PRACH resource set and RACH resource allocation) to the UE through RRC signaling.

Figure 5D:
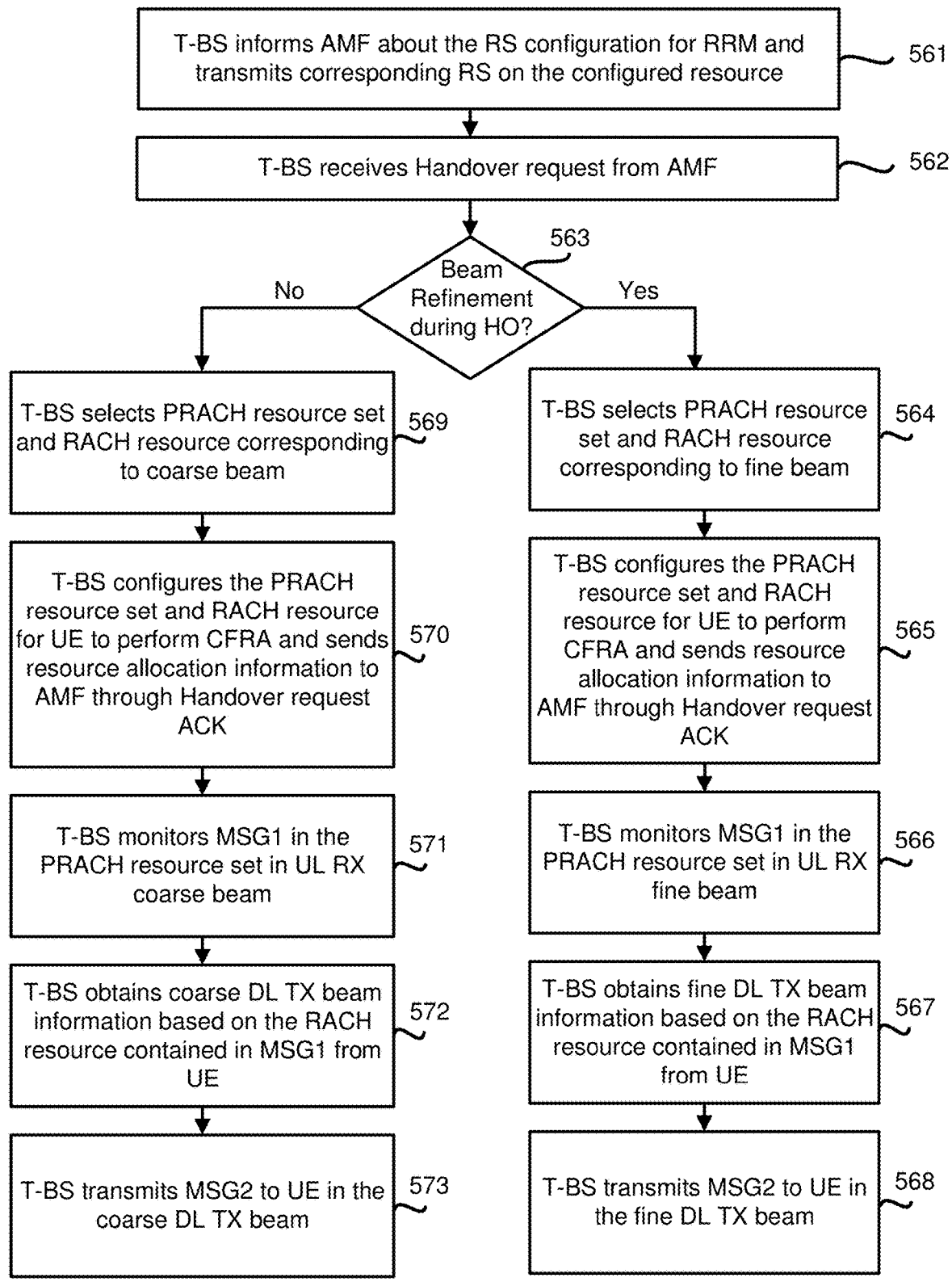
FIG. 5D is a block diagram illustrating actions taken by a target base station for beam refinement during an NG-based handover procedure with CFRA, according to an example implementation of the present application.

FIG. 5D is a block diagram illustrating actions taken by a target base station for beam refinement during an NG-based handover procedure with CFRA, according to an example implementation of the present application. In one implementation, the target base station may substantially correspond to target base station 508 in FIG. 5A. In one implementation, blocks 561, 562, 563, 564, 565, 566, 567, 568, 569, 570, 571, 572, and 573 in FIG. 5D may be substantially similar to blocks 361, 362, 363, 364, 365, 366, 367, 368, 369, 370, 371, 372, and 373, respectively, in FIG. 3D. Among the differences, in FIG. 5D, the target base station communicates with the source base station through an AMF.

As shown in FIG. 5D, in block 561, the target base station may inform the AMF about the RS configuration for RRM and transmit corresponding RS on the configured resource. In block 562, the target base station may receive a handover request from the AMF. In block 563, the target base station may decide whether to trigger beam refinement during handover based on the data requirement report. If beam refinement during handover is triggered in block 563, the target base station may perform blocks 564 through 568. Otherwise, the target base station may perform blocks 569 through 573.

In block 564, the target base station may select fine beam related PRACH and/or RACH resources. In block 565, the target base station may configure the PRACH resource set and RACH resource for the UE to perform CFRA, and send resource allocation information to the AMF through a handover request ACK message. In block 566, the target base station may monitor MSG1 in the PRACH resource set in fine UL RX beam. In block 567, the target base station may obtain fine DL transmission beam information based on the RACH resource contained in MSG1 from the UE. In block 568, the target base station may transmit MSG2 to the UE in the fine DL TX beam.

If beam refinement during handover is not triggered in block 563, the target base station may perform blocks 569 through 573.

In block 569, the target base station may select coarse beam related PRACH and/or RACH resources. In block 570, the target base station may configure the PRACH resource set and RACH resource for the UE to perform CFRA, and send resource allocation information to the AMF through the handover request ACK message.

In block 571, the target base station may monitor MSG1 in the PRACH resource set in UL reception coarse beam. In block 572, the target base station may obtain coarse DL TX beam information based on the RACH resource contained in MSG1 from the UE. In block 573, the target base station may transmit MSG2 to the UE in the coarse DL TX beam. It should be noted that blocks 569, 570, 571, 572, and 573 may be similar to blocks 564, 565, 566, 567, and 568, respectively, except that coarse beam related PRACH and/or RACH resources, and coarse beams are selected, configured, allocated, monitored, obtained, transmitted, and/or used in blocks 369, 370, 371, 372, and 373.

Figure 5E:
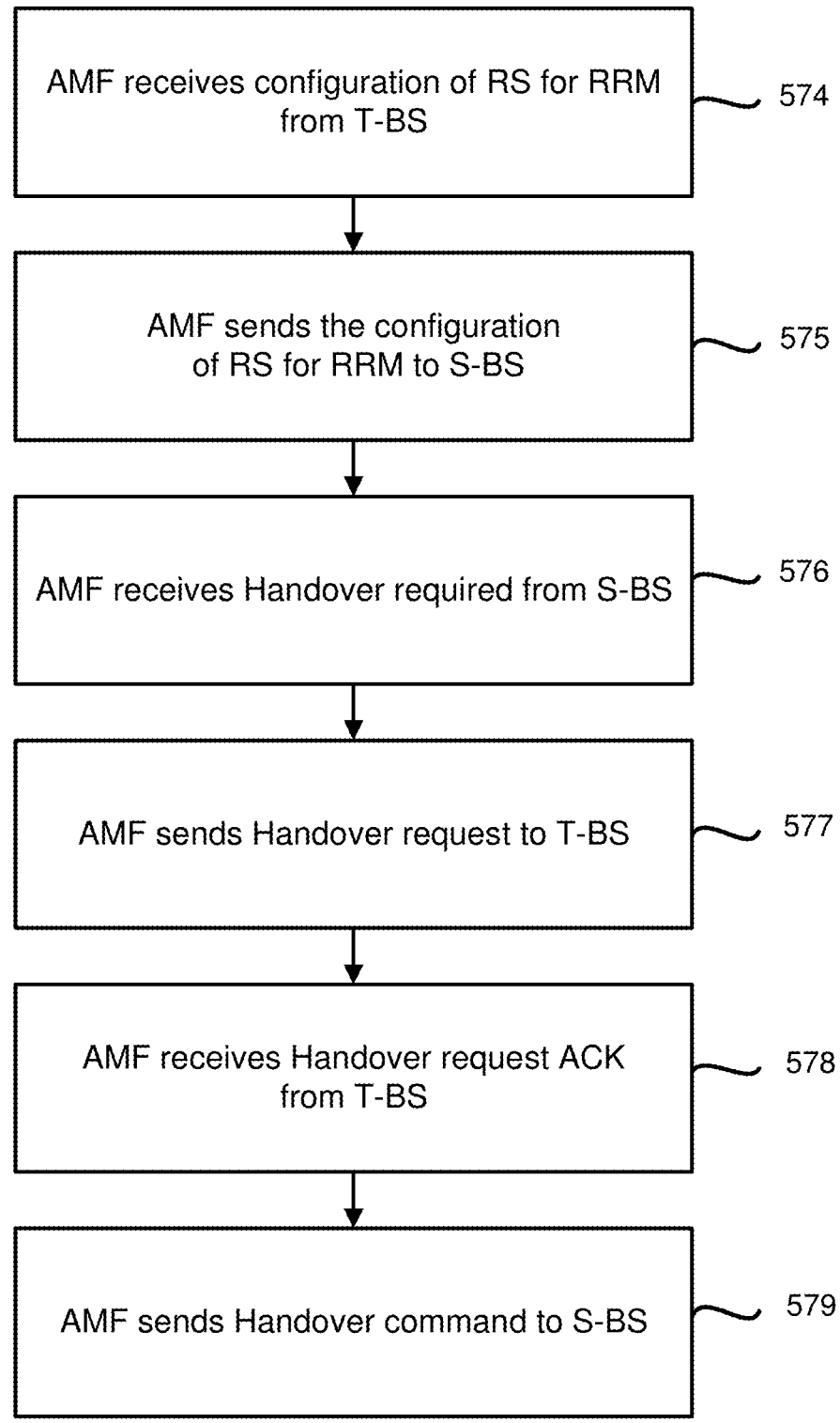
FIG. 5E is a block diagram illustrating actions taken by an AMF for beam refinement during an NG-based handover procedure with CFRA, according to an example implementation of the present application.

FIG. 5E is a block diagram illustrating actions taken by an AMF for beam refinement during an NG-based handover procedure with CFRA, according to an example implementation of the present application. In one implementation, the AMF may substantially correspond to AMF 512 in FIG. 5A.

As shown in FIG. 5E, in block 574, the AMF may receive configuration of RS for RRM from the target base station. In block 575, the AMF may send the configuration of RS for RRM to the source base station. In block 576, the AMF may receive the handover required message from the source base station. In block 577, the AMF may send the handover request to the target base station. In block 578, the AMF may receive the handover request ACK from the target base station. In block 579, the AMF may send the Handover Command to the source base station.

In implementations of the present application, a PRACH resource set (PRACH resource set comprises multiple PRACH resources) may be associated with one or more SS blocks, which means that a UE may select the corresponding PRACH resource set based on the SS block ID(s) contained in the corresponding SS block(s), and the SS block(s) are transmitted in different beams from a base station for example. The PRACH resource may include MSG1 transmission time, MSG1 transmission frequency and MSG1 preamble format. Once a base station receives the MSG1 from the UE, the base station can obtain downlink transmission (DL TX) beam information from the MSG1. For example, the MSG1 can map to a specific SS block index.

Figure 6:
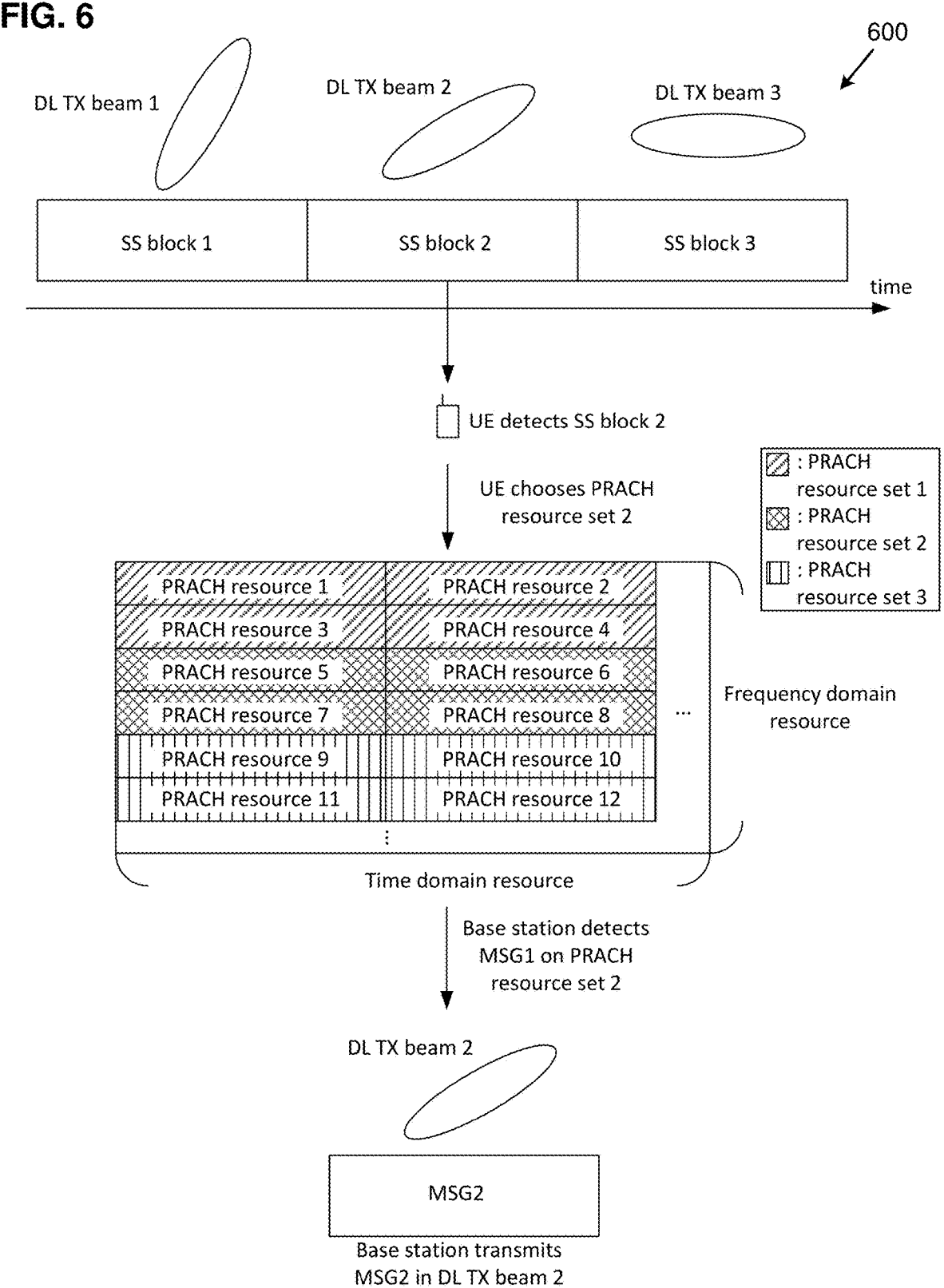
FIG. 6 illustrates a detailed procedure on how to determine DL TX beam for MSG2 based on MSG1, according to an example implementation of the present application.

FIG. 6 depicts a detailed procedure on how to determine DL TX beam for MSG2 based on MSG1, according to an example implementation of the present application. As shown in FIG. 6, a base station transmits DL TX beams 1, 2 and 3 to a UE. SS blocks 1, 2 and 3 are transmitted in DL TX beams 1, 2 and 3, respectively. The UE may select a PRACH resource set based on the SS block IDs contained in the corresponding SS blocks. In the present implementation, the UE detects SS block 2 in DL TX beam 2, and is able to identify the SS block ID contained in SS block 2. The UE may then choose PRACH resource set 2 based on the SS block ID associated with SS block 2, where the PRACH resource set 2 includes PRACH resources 5, 6, 7 and 8. Once the base station detects MSG1 on PRACH resource set 2, the base station may determine the DL TX beam for MSG2 based on MSG1, and transmit MSG2 in DL TX beam 2 to the UE.

Furthermore, if the base station has beam correspondence capability (BC), the base station may obtain uplink reception beam information (UL RX) based on the PRACH resource set of MSG1. Beam correspondence allows the UE to determine a RX beam by beam information (e.g., beam index) of a qualified TX beam, and allows the TRP to determine a TX beam by beam information (e.g., beam index) of a qualified RX beam, for example. With beam correspondence, the base station can obtain DL TX beam information upon obtaining UL RX beam information, and vice versa. On the other hand, if without beam correspondence, the base station has to perform RX beam sweeping while detecting MSG1 to select a qualified RX beam. In both cases, the base station can obtain UL RX beam information based on the PRACH resource of MSG1.

Figure 7:
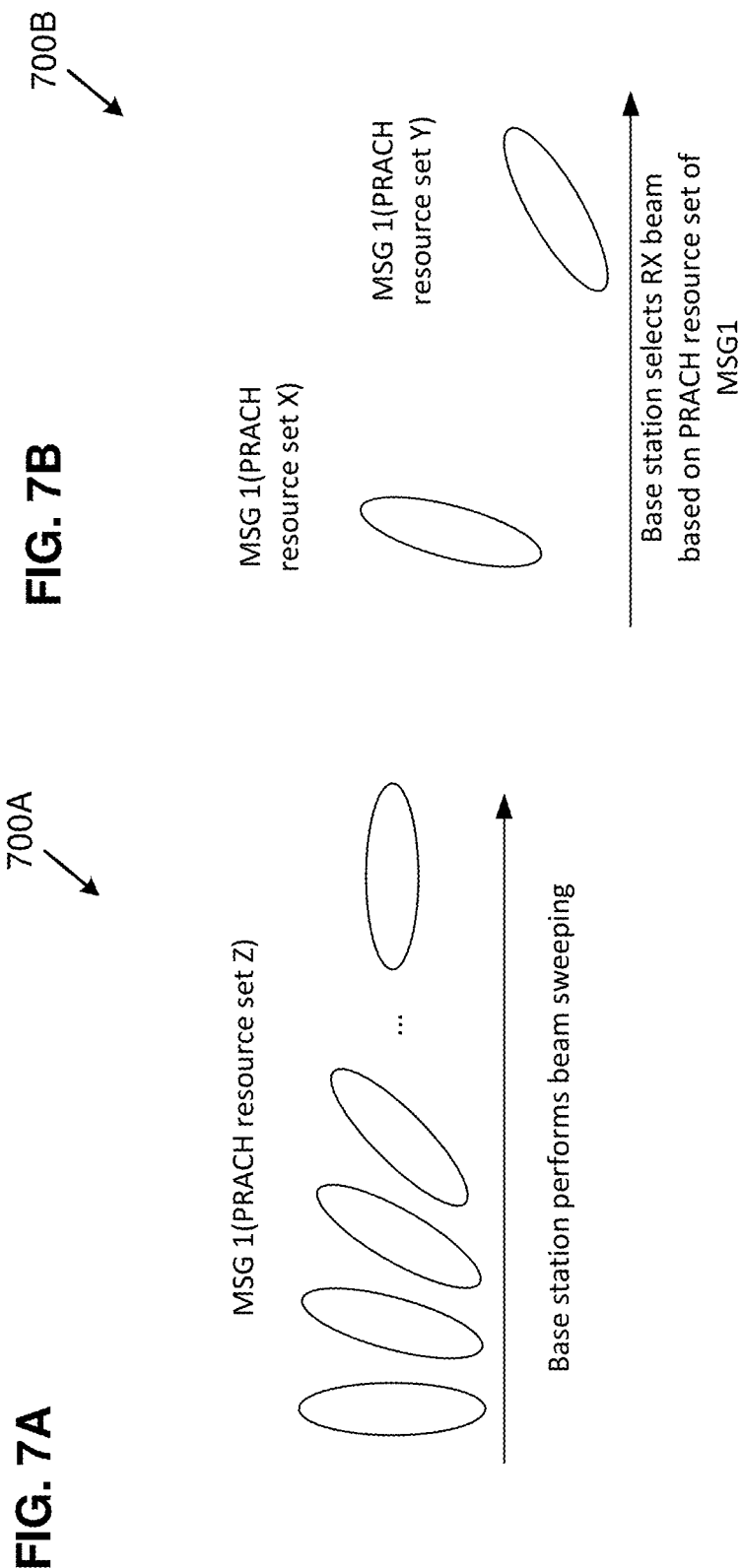
FIG. 7A is a diagram illustrating a procedure of a base station selecting a UL RX beam through MSG1 without BC, according to an example implementation of the present application.
FIG. 7B is a diagram illustrating a base station selecting a UL RX beam during MSG1 with BC, according to an example implementation of the present application.

FIG. 7A is a diagram illustrating a procedure of a base station selecting a UL RX beam through MSG1 without beam correspondence, according to an example implementation of the present application. As shown in FIG. 7A, in diagram 700A, since the base station does not have beam correspondence, the base station performs RX beam sweeping while detecting MSG1 to select a qualified RX beam.

FIG. 7B is a diagram illustrating a base station selecting a UL RX beam during MSG1 with beam correspondence, according to an example implementation of the present application. As shown in FIG. 7B, in diagram 700B, since the base station has beam correspondence, the base station can obtain UL RX beam information based on the PRACH resource set of MSG1.

Thus, according to implementations of the present application, a UE may obtain DL RX beam information while detecting SS blocks. A UE may also perform UL TX beam sweeping to obtain UL TX beam information through the feedback from the base station. Since both the UE and base station can perform beam selection through MSG1, dedicated PRACH resource can be used to perform beam refinement during handover.

Among other advantages, implementations of the present application perform beam refinement during a handover procedure such that the target base station can apply higher data rate and better link quality immediately after the handover procedure to maintain the quality of service.

Figure 8:
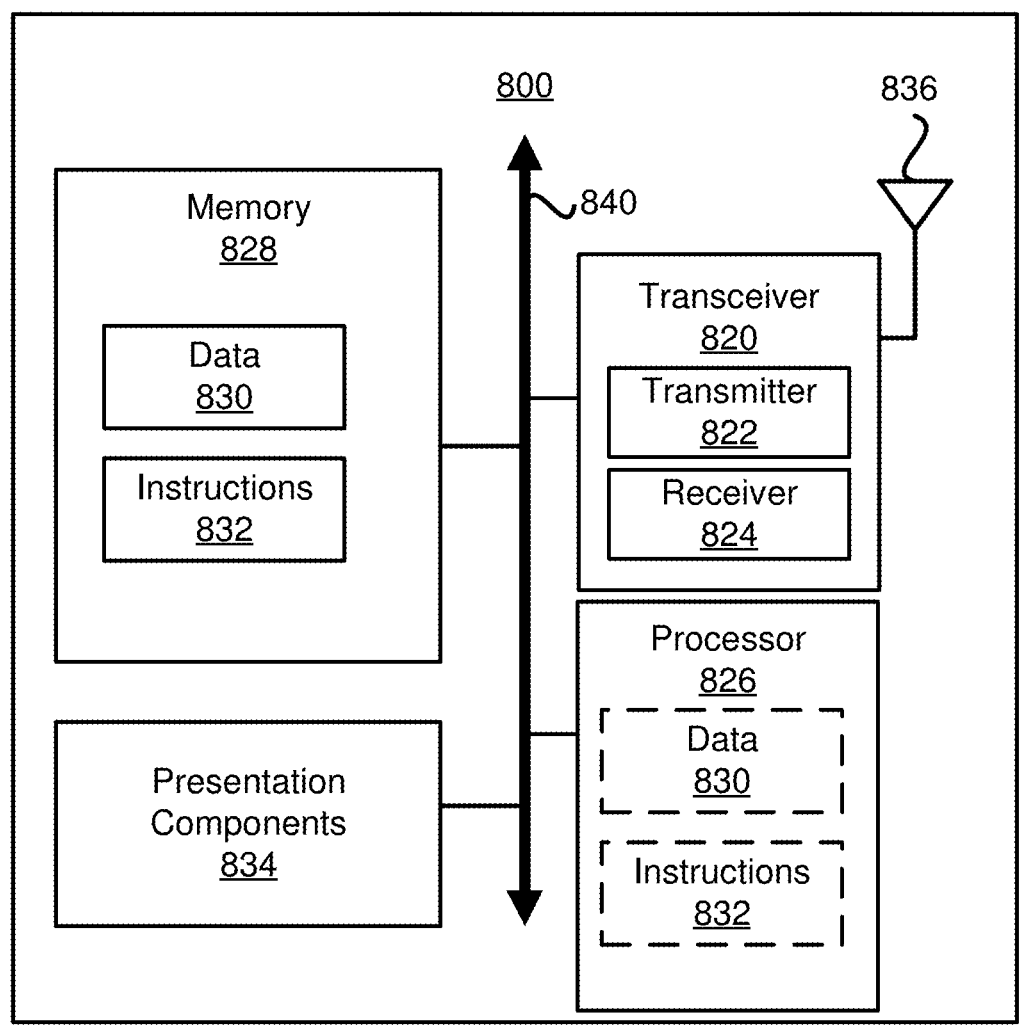
FIG. 8 is a block diagram illustrating a radio communication equipment, in accordance with an example implementation of the present application.

FIG. 8 illustrates a block diagram of a node for wireless communication, in accordance with various aspects of the present application. As shown in FIG. 8, node 800 may include transceiver 820, processor 826, memory 828, one or more presentation components 834, and at least one antenna 836. Node 800 may also include an RF spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control channels.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Example memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1A through 7B. Alternatively, instructions 832 may not be directly executable by processor 826 but be configured to cause node 800 (e.g., when compiled and executed) to perform various functions described herein.

Processor 826 may include an intelligent hardware device, e.g., a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. Example one or more presentation components 834 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A method for performing handover of a user equipment (UE) from a source base station to a target base station, the method comprising:
   providing, by the UE, a measurement report to the source base station, the measurement report including beam-related measurements of the target base station;
   providing, by the source base station, a Handover Request message to the target base station, the Handover Request message including the measurement report from the UE;
   configuring, by the target base station, a preamble index and a physical random access channel (PRACH) resource for the UE;
   providing, by the target base station, a Handover Request Acknowledgement message to the source base station, the Handover Request Acknowledgement message having a Handover Command, the Handover Command including resource allocation information of the preamble index and the PRACH resource;
   providing, by the source base station, mobility control information to the UE based on the Handover Command from the target base station;
   selecting, by the UE, the preamble index and the PRACH resource;
   transmitting, by the UE, a random access preamble to the target base station in the selected PRACH resource;
   wherein at least one of the PRACH resource or the preamble index is selected by the UE based on measurements of at least one of channel state information-reference signal (CSI-RS) reference signal received power (CSI-RS-RSRP) or synchronization signal (SS) block reference signal received power (SSB-RSRP);
   wherein, when receiving a Physical Downlink Shared Channel (PDSCH) for a random access response from the target base station, the UE assumes that antenna ports of a demodulation reference signal (DM-RS) of the PDSCH are quasi co-located with one of an SS block and a CSI-RS resource selected by the UE for random access channel (RACH) transmission and RACH association with at least one of the PRACH resource or the preamble index with respect to one or more large scale channel properties or spatial RX parameters.

2. The method of claim 1,
   wherein the measurement report is contained in an information element of the Handover Request message.

3. The method of claim 1,
   wherein the measurement report includes at least one of an SS block index or a CSI-RS resource index (CRI).

4. The method of claim 1,
   wherein the target base station configures at least one preamble index and at least one PRACH resource corresponding to the measurement report, and sends resource allocation information of the at least one preamble index and the at least one PRACH resource to the source base station through the Handover Request Acknowledgement message.

5. The method of claim 1,
wherein the Handover Request message further includes a data requirement report of the UE.

6. The method of claim 5, further comprising:
determining, by the target base station, whether to perform beam refinement during the handover based on the data requirement report.

7. The method of claim 6,
wherein, when the target base station determines to perform beam refinement, the preamble index and the PRACH resource configured by the target base station correspond to at least one fine beam.

8. The method of claim 6,
wherein, when the target base station determines not to perform beam refinement, the preamble index and the PRACH resource configured by the target base station correspond to at least one coarse beam.

9. The method of claim 1,
wherein the Handover Request message is provided by the source base station to the target base station through an access and mobility management function (AMF).

10. The method of claim 1,
wherein the target base station detects the random access preamble from the UE in the selected PRACH resource.

11. A user equipment (UE) comprising:
one or more non-transitory computer-readable media having computer-executable instructions embodied thereon;
at least one processor coupled to the one or more non-transitory computer-readable media, and configured to execute the computer-executable instructions to:
provide a measurement report to a target base station through a source base station, the measurement report including beam-related measurements of the target base station based on a measurement configuration provided by the target base station;
communicate with the target base station based on the beam-related measurements, when the source base station decides to handover the UE to the target base station;
select a preamble index and a physical random access channel (PRACH) resource;
transmit a random access preamble to the target base station in the selected PRACH resource;
wherein at least one of the PRACH resource or the preamble index is selected by the UE based on measurements of at least one of channel state information-reference signal (CSI-RS) reference signal received power (CSI-RS-RSRP) or synchronization signal (SS) block reference signal received power (SSB-RSRP);
wherein the target base station monitors the PRACH resource using a spatial domain filter and transmits at least one of an SS block index or a CSI-RS resource index (CRI) to the UE in a Handover Command using the spatial domain filter.

12. The UE of claim 11,
wherein the measurement report includes the at least one of the SS block index or the CRI.

13. The UE of claim 11,
wherein the at least one processor is further configured to execute the computer-executable instructions to receive a random access response from the target base station through a downlink transmission beam.

14. The UE of claim 13,
wherein the target base station transmits a Physical Downlink Shared Channel (PDSCH) for the random access response to the UE;
wherein antenna ports of a demodulation reference signal (DM-RS) for the random access response from the target base station to the UE are quasi co-located with one of an SS block and a CSI-RS resource selected by the UE for random access channel (RACH) transmission and RACH association with at least one of the PRACH resource or the preamble index with respect to one or more large scale channel properties or spatial receive (RX) parameters.

15. The UE of claim 14,
wherein, when receiving the PDSCH for the random access response, the UE assumes that the DM-RS ports of the PDSCH is quasi co-located with one of the SS block and the CSI-RS resource selected by the UE for the RACH transmission and the RACH association with at least one of the PRACH resource or the preamble index with respect to the one or more large scale channel properties or spatial RX parameters.

* * * * *